US006993710B1

(12) United States Patent
Coad et al.

(10) Patent No.: US 6,993,710 B1
(45) Date of Patent: Jan. 31, 2006

(54) METHOD AND SYSTEM FOR DISPLAYING CHANGES OF SOURCE CODE

(75) Inventors: Peter Coad, Raleigh, NC (US); Dietrich Charisius, Stuttgart (DE)

(73) Assignee: Borland Software Corporation, Cupertino, CA (US)

( * ) Notice: Subject to any disclaimer, the term of this patent is extended or adjusted under 35 U.S.C. 154(b) by 413 days.

(21) Appl. No.: 09/680,065

(22) Filed: Oct. 4, 2000

Related U.S. Application Data

(60) Provisional application No. 60/157,826, filed on Oct. 5, 1999, provisional application No. 60/199,046, filed on Apr. 21, 2000.

(51) Int. Cl.
   *G06F 15/00* (2006.01)

(52) U.S. Cl. .................. 715/511; 715/524; 715/530; 715/764; 715/767

(58) Field of Classification Search ........... 345/751, 345/772, 781, 552, 752, 804, 853, 703, 707, 345/708; 717/105, 110, 128, 122, 120, 121, 717/123; 715/511, 512, 524, 530; 707/203, 707/204
See application file for complete search history.

(56) References Cited

U.S. PATENT DOCUMENTS

| | | | |
|---|---|---|---|
| 4,558,413 A | | 12/1985 | Schmidt et al. |
| 4,599,692 A | | 7/1986 | Tan et al. |
| 5,428,729 A | * | 6/1995 | Chang et al. ............... 345/751 |
| 5,555,410 A | * | 9/1996 | Tsuchiya ................. 707/104.1 |
| 5,579,469 A | * | 11/1996 | Pike ............................ 345/781 |
| 5,649,200 A | * | 7/1997 | Leblang et al. ............. 717/122 |
| 5,960,196 A | | 9/1999 | Carrier, III et al. |
| 6,247,020 B1 | * | 6/2001 | Minard ........................ 345/629 |
| 6,330,008 B1 | * | 12/2001 | Razdow et al. ............. 345/772 |
| 6,346,945 B1 | * | 2/2002 | Mansurov et al. .......... 345/473 |
| 6,493,868 B1 | * | 12/2002 | DaSilva et al. ............. 717/105 |
| 2001/0011367 A1 | * | 8/2001 | Logan et al. .................. 717/1 |
| 2002/0049962 A1 | * | 4/2002 | Kelbaugh et al. ........... 717/128 |

FOREIGN PATENT DOCUMENTS

| | | |
|---|---|---|
| EP | 1 030 242 A2 | 8/2000 |
| EP | 1 030 252 A1 | 8/2000 |

OTHER PUBLICATIONS

Byun et al., High-Level CHILL Debugging System in Cross-Development Environments, 1998, IEEE, pp. 211-216.*
Koike et al., VRCS: Integrating Version Control and Module Management using Interactive Three-Dimensional Graphics, 1997, IEEE, pp. 168-173.*
Per Cederqvist et al., Version Management with CVS for CVS 1.11.3, 1992, 1993, Signum Support AB, pp. 1-170.*
Dietel et al., Java How to Program, Second Edition, Copyright 1997 & 1998, pp. 1-11.*

* cited by examiner

*Primary Examiner*—Weilun Lo
*Assistant Examiner*—Truc T. Chuong
(74) *Attorney, Agent, or Firm*—MacCord Mason PLLC

(57) ABSTRACT

Methods and systems consistent with the present invention provide an improved software development tool which displays versions of source code with the indications of the edits in a graphical representation, wherein the graphical representation of the source code is not merely a text representation on a user interface. Each version reflects an instance in an edit history, i.e., reflects the changes made to the source code.

30 Claims, 24 Drawing Sheets

METHOD AND SYSTEM FOR DISPLAYING CHANGES OF SOURCE CODE

CROSS-REFERENCE TO RELATED APPLICATIONS

The following identified U.S. patent applications are relied upon and are incorporated by reference in this application:

U.S. Provisional Application No. 60/157,826, entitled "Visual Unified Modeling Language Development Tool," filed on Oct. 5, 1999;

U.S. Provisional Application No. 60/199,046, entitled "Software Development Tool," filed on Apr. 21, 2000;

U.S. patent application Ser. No. 09/680,063 entitled "Method And System For Developing Software," and filed on the same date herewith;

U.S. patent application Ser. No. 09/680,030 entitled "Method And System For Generating, Applying, And Defining A Pattern," and filed on the same date herewith; and U.S. patent application Ser. No. 09/680,064 entitled "Method And System For Collapsing A Graphical Representation Of Related Elements," and filed on the same date herewith.

FIELD OF THE INVENTION

The present invention relates to a method and system for developing software. More particularly, the invention relates to a method and system for tracking changes made to source code, and displaying the source code with these changes.

BACKGROUND OF THE INVENTION

Computer instructions are written in source code. Although a skilled programmer can understand source code to determine what the code is designed to accomplish, with highly complex software systems, a graphical representation or model of the source code is helpful to organize and visualize the structure and components of the system. Using models, the complex systems are easily identified, and the structural and behavioral patterns can be visualized and documented.

The well-known Unified Modeling Language (UML) is a general-purpose notational language for visualizing, specifying, constructing, and documenting complex software systems. UML is used to model systems ranging from business information systems to Web-based distributed systems, to real-time embedded systems. UML formalizes the notion that real-world objects are best modeled as self-contained entities that contain both data and functionality. UML is more clearly described in the following references, which are incorporated herein by reference: (1) Martin Fowler, *UML Distilled Second Edition: Applying the Standard Object Modeling Language*, Addison-Wesley (1999); (2) Booch, Rumbaugh, and Jacobson, *The Unified Modeling Language User Guide*, Addison-Wesley (1998); (3) Peter Coad, Jeff DeLuca, and Eric Lefebvre, *Java Modeling in Color with UML: Enterprise Components and Process*, Prentice Hall (1999); and (4) Peter Coad, Mark Mayfield, and Jonathan Kern, *Java Design: Building Better Apps & Applets* (2nd Ed.), Prentice Hall (1998).

As shown in FIG. 1, conventional software development tools 100 allow a programmer to view UML 102 while viewing source code 104. The source code 104 is stored in a file, and a reverse engineering module 106 converts the source code 104 into a representation of the software project in a database or repository 108. The software project comprises source code 104 in at least one file which, when compiled, forms a sequence of instructions to be run by the data processing system. The repository 108 generates the UML 102. If any changes are made to the UML 102, they are automatically reflected in the repository 108, and a code generator 110 converts the representation in the repository 108 into source code 104. Such software development tools 100, however, do not synchronize the displays of the UML 102 and the source code 104. Rather, the repository 108 stores the representation of the software project while the file stores the source code 104. A modification in the UML 102 does not appear in the source code 104 unless the code generator 110 re-generates the source code 104 from the data in the repository 108. When this occurs, the entire source code 104 is rewritten. Similarly, any modifications made to the source code 104 do not appear in the UML 102 unless the reverse engineering module 106 updates the repository 108. As a result, redundant information is stored in the repository 108 and the source code 104. In addition, rather than making incremental changes to the source code 104, conventional software development tools 100 rewrite the overall source code 104 when modifications are made to the UML 102, resulting in wasted processing time. This type of manual, large-grained synchronization requires either human intervention, or a "batch" style process to try to keep the two views (the UML 102 and the source code 104) in sync. Unfortunately, this approach, adopted by many tools, leads to many undesirable side-effects; such as desired changes to the source code being overwritten by the tool. A further disadvantage with conventional software development tools 100 is that they are designed to only work in a single programming language. Thus, a tool 100 that is designed for Java™ programs cannot be utilized to develop a program in C++. Moreover, it is not possible to track the changes made to the source code using conventional software development tools. Accordingly, unless the developer maintains detailed notes regarding the development of the source code, it is difficult to determine what modifications to the source code were attempted during its development. There is a need in the art for a tool that avoids the limitations of these conventional software development tools.

SUMMARY OF THE INVENTION

Methods and systems consistent with the present invention provide an improved software development tool which overcomes the limitations of conventional software development tools. The improved software development tool of the present invention allows a developer to track changes made to source code, and display the source code with these changes. Accordingly, the developer can recollect the modifications that were made to the source code during the development of the source code.

In accordance with methods consistent with the present invention, a method is provided in a data processing system for displaying versions of source code. Each version reflects an instance in an edit history. The method comprises the steps of storing indications of the edits to the source code, and displaying the versions of the source code with the indications of the edits.

In accordance with articles of manufacture consistent with the present invention, a computer-readable medium is provided. The computer-readable medium contains instructions for controlling a data processing system to perform a method. The data processing system has versions of source code. Each version reflects an instance in an edit history. The method comprises the steps of storing indications of the edits to the source code, and displaying the versions of the source code with the indications of the edits.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Methods and systems consistent with the present invention provide an improved software development tool which displays versions of source code. Each version reflects an instance in an edit history, i.e., reflects the changes made to the source code.

Figure 1:
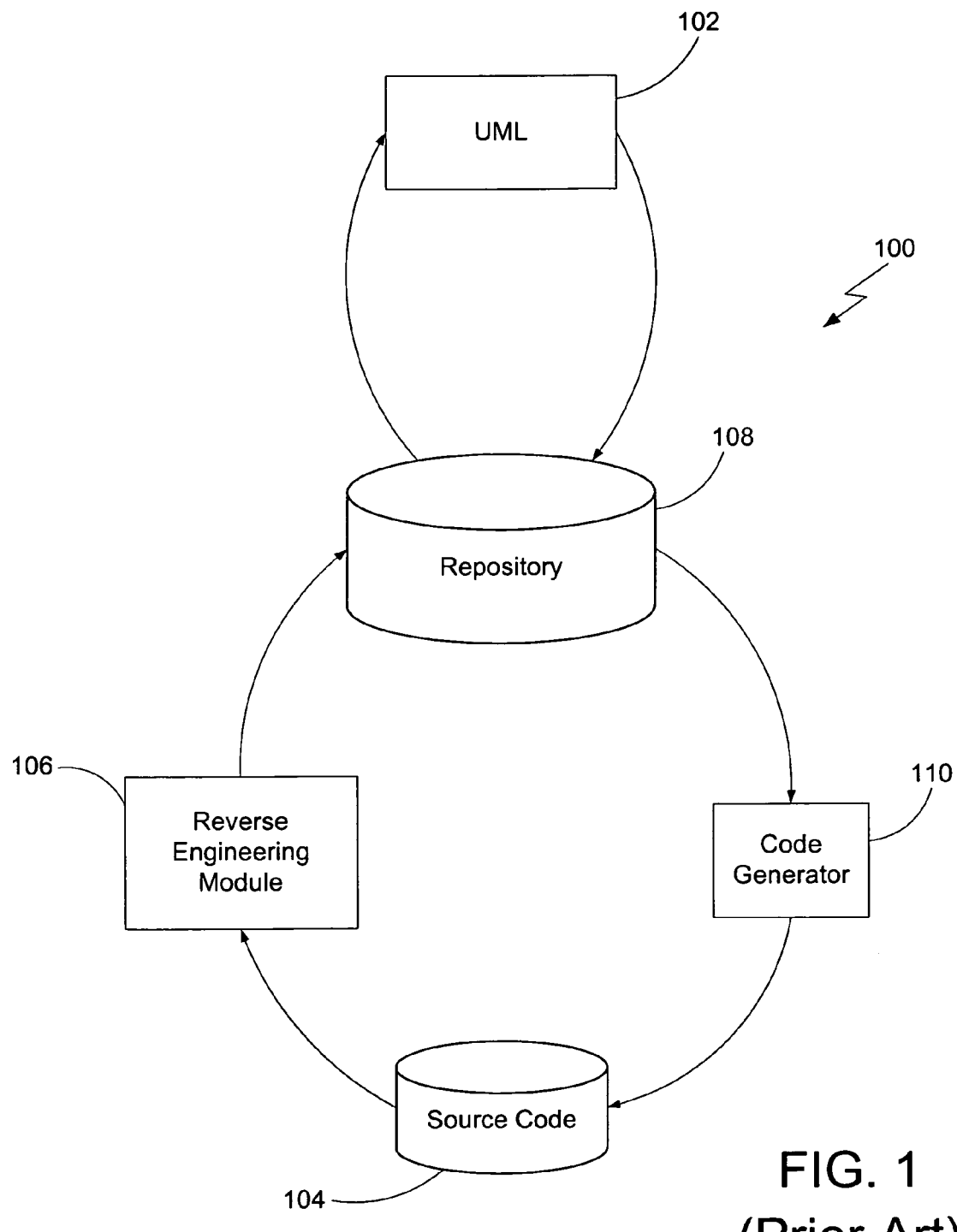
FIG. 1 depicts a conventional software development tool.
Figure 2:
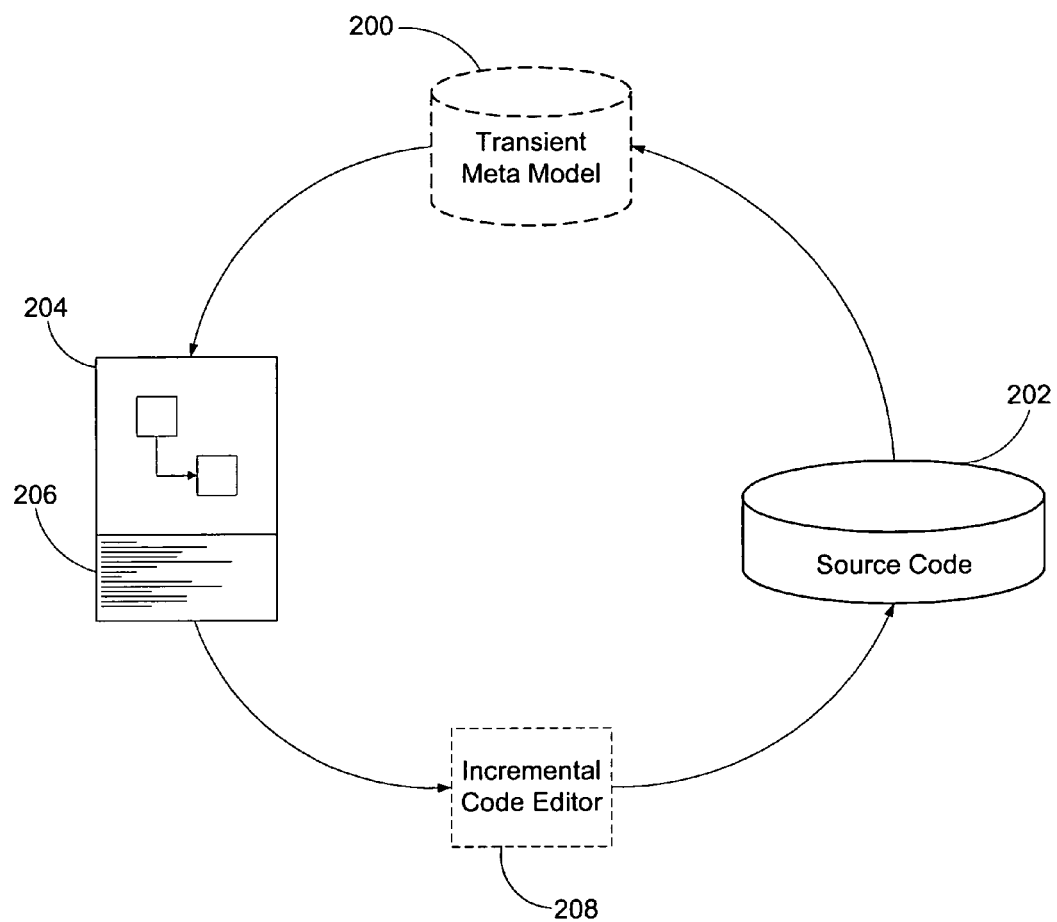
FIG. 2 depicts an overview of a software development tool in accordance with the present invention.

As depicted in FIG. 2, source code 202 is being displayed in both a graphical form 204 and a textual form 206. In accordance with methods and systems consistent with the present invention, the improved software development tool generates a transient meta model (TMM) 200 which stores a language-neutral representation of the source code 202. The graphical 204 and textual 206 representations of the source code 202 are generated from the language-neutral representation in the TMM 200. Although modifications made on the displays 204 and 206 may appear to modify the displays 204 and 206, in actuality all modifications are made directly to the source code 202 via an incremental code editor (ICE) 208, and the TMM 200 is used to generate the modifications in both the graphical 204 and the textual 206 views from the modifications to the source code 202.

The improved software development tool provides simultaneous round-trip engineering, i.e., the graphical representation 204 is synchronized with the textual representation 206. Thus, if a change is made to the source code 202 via the graphical representation 204, the textual representation 206 is updated automatically. Similarly, if a change is made to the source code 202 via the textual representation 206, the graphical representation 204 is updated to remain synchronized. There is no repository, no batch code generation, and no risk of losing code.

Figure 3:
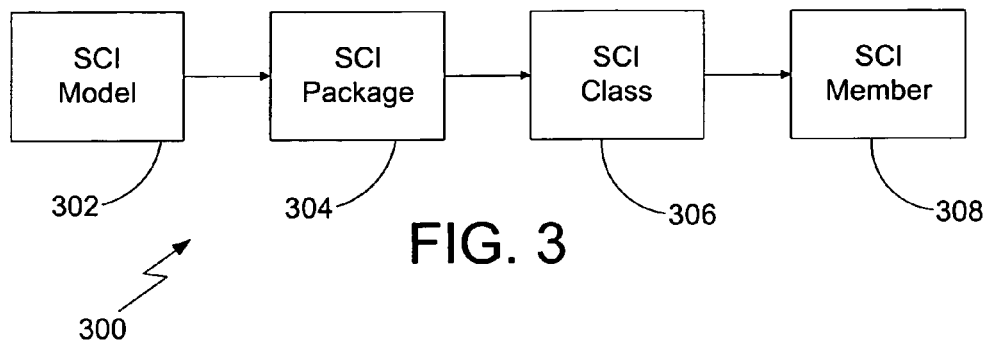
FIG. 3 depicts a data structure of the language-neutral representation created by the software development tool of FIG. 2.

The data structure 300 of the language-neutral representation is depicted in FIG. 3. The data structure 300 comprises a Source Code Interface (SCI) model 302, an SCI package 304, an SCI class 306, and an SCI member 308. The SCI model 302 is the source code organized into packages. The SCI model 302 corresponds to a directory for a software project being developed by the user, and the SCI package 304 corresponds to a subdirectory. The software project comprises the source code in at least one file that is compiled to form a sequence of instructions to be run by a data processing system. The data processing system is discussed in detail below. As is well known in object-oriented programming, the class 306 is a category of objects which describes a group of objects with similar properties (attributes), common behavior (operations or methods), common relationships to other objects, and common semantics. The members 308 comprise attributes and/or operations.

Figure 4:
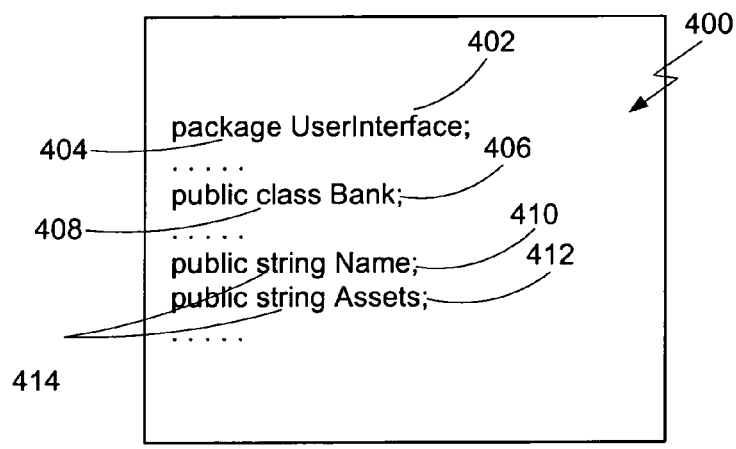
FIG. 4 depicts representative source code.
Figure 5:
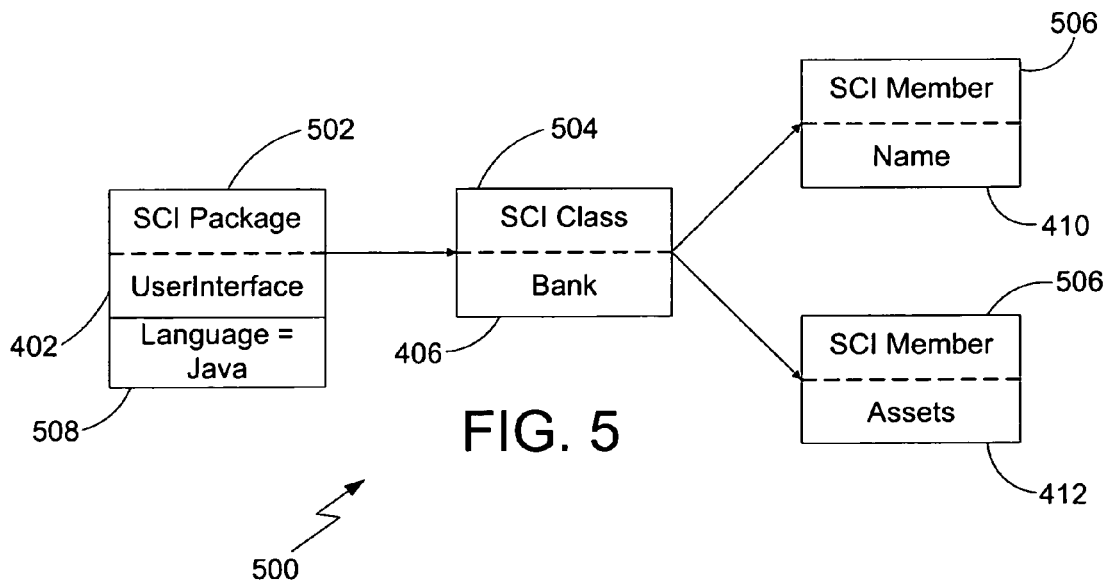
FIG. 5 depicts the data structure of the language-neutral representation of the source code of FIG. 4.

For example, the data structure 500 for the source code 400 depicted in FIG. 4 is depicted in FIG. 5. UserInterface 402 is defined as a package 404. Accordingly, UserInterface 402 is contained in SCI package 502. Similarly, Bank 406, which is defined as a class 408, is contained in SCI class 504, and Name 410 and Assets 412, which are defined as attributes (strings 414), are contained in SCI members 506. Since these elements are in the same project, all are linked. The data structure 500 also identifies the language in which the source code is written 508, e.g., the Java™ language.

Figure 6:
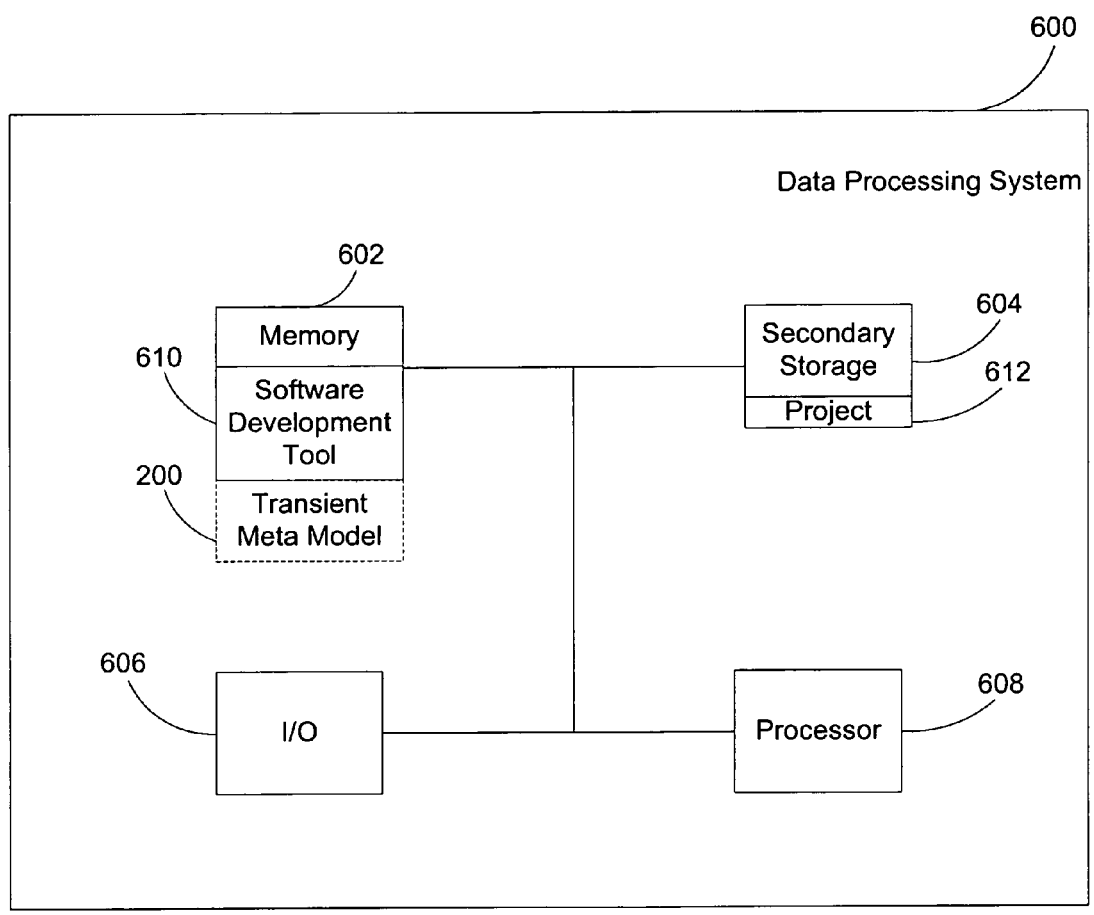
FIG. 6 depicts a data processing system suitable for practicing the present invention.

FIG. 6 depicts a data processing system 600 suitable for practicing methods and systems consistent with the present invention. Data processing system 600 comprises a memory 602, a secondary storage device 604, an I/O device 606, and a processor 608. Memory 602 includes the improved software development tool 610. The software development tool 610 is used to develop a software project 612, and create the TMM 200 in the memory 602. The project 612 is stored in the secondary storage device 604 of the data processing system 600. One skilled in the art will recognize that data processing system 600 may contain additional or different components.

Although aspects of the present invention are described as being stored in memory, one skilled in the art will appreciate that these aspects can also be stored on or read from other types of computer-readable media, such as secondary storage devices, like hard disks, floppy disks or CD-ROM; or other forms of RAM or ROM either currently known or later developed.

Figure 7:
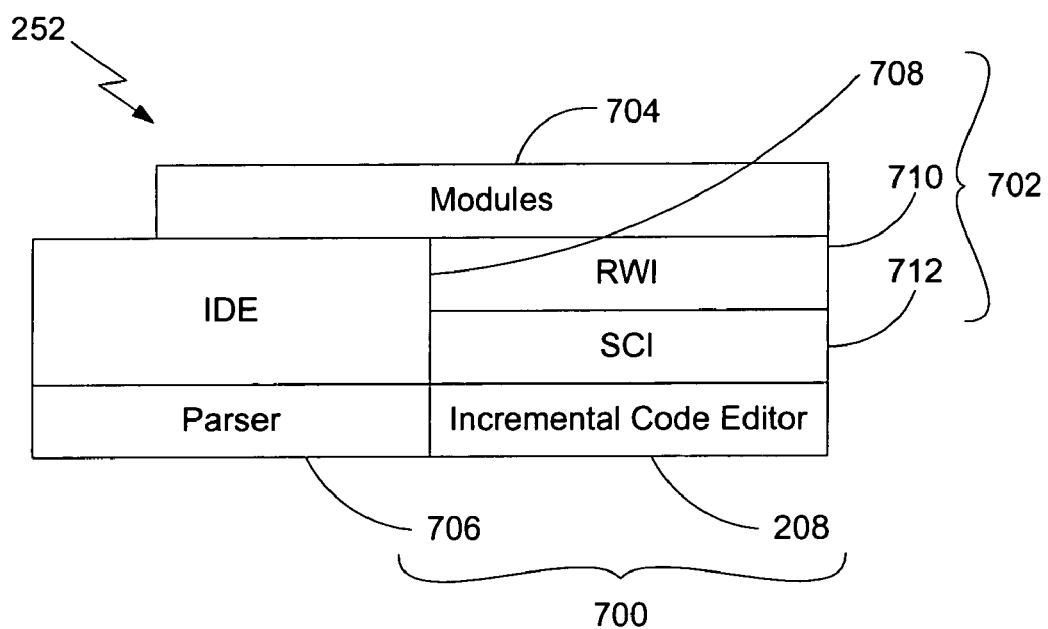
FIG. 7 depicts an architectural overview of the software development tool of FIG. 2.

FIG. 7 illustrates an architectural overview of the improved software development tool 610. The tool 610 comprises a core 700, an open application program interface (API) 702, and modules 704. The core 700 includes a parser 706 and an ICE 208. The parser 706 converts the source code into the language-neutral representation in the TMM, and the ICE 208 converts the text from the displays into source code. There are three main packages composing the API 702: Integrated Development Environment (IDE) 708; Read-Write Interface (RWI) 710; and Source Code Interface (SCI) 712. Each package includes corresponding subpackages. As is well known in the art, a package is a collection of attributes, notifications, operations, or behaviors that are treated as a single module or program unit.

IDE 708 is the API 702 needed to generate custom outputs based on information contained in a model. It is a read-only interface, i.e., the user can extract information from the model, but not change the model. IDE 708 provides the functionality related to the model's representation in IDE 708 and interaction with the user. Each package composing the IDE group has a description highlighting the areas of applicability of this concrete package.

RWI 710 enables the user to go deeper into the architecture. Using RWI 710, information can be extracted from and written to the models. RWI not only represents packages, classes and members, but it may also represent different diagrams (class diagrams, use case diagrams, sequence diagrams and others), links, notes, use cases, actors, states, etc.

SCI 712 is at the source code level, and allows the user to work with the source code almost independently of the language being used.

There are a variety of modules 704 in the software development tool 610 of the present invention. Some of the modules 704 access information to generate graphical and code documentation in custom formats, export to different file formats, or develop patterns. The software development tool also includes a quality assurance (QA) module which monitors the modifications to the source code and calculates the complexity metrics, i.e., the measurement of the program's performance or efficiency, to support quality assurance. The types of metrics calculated by the software development tool include basic metrics, cohesion metrics, complexity metrics, coupling metrics, Halstead metrics, inheritance metrics, maximum metrics, polymorphism metrics, and ratio metrics. Examples of these metrics with their respective definitions are identified in Tables 1–9 below.

TABLE 1

Basics Metrics

| Basic Metrics | Description |
| --- | --- |
| Lines Of Code | Counts the number of code lines. |
| Number Of Attributes | Counts the number of attributes. If a class has a high number of attributes, it may be appropriate to divide it into subclasses. |
| Number Of Classes | Counts the number of classes. |
| Number Of Import Statements | Counts the number of imported packages/classes. This measure can highlight excessive importing, and also can be used as a measure of coupling. |
| Number Of Members | Counts the number of members, i.e., attributes and operations. If a class has a high number of members, it may be appropriate to divide it into subclasses. |
| Number Of Operations | Counts the number of operations. If a class has a high number of operations, it may be appropriate to divide it into subclasses. |

TABLE 2

Cohesion Metrics

| Cohesion Metrics | Description |
| --- | --- |
| Lack Of Cohesion Of Methods 1 | Takes each pair of methods in the class and determines the set of fields they each access. A low value indicates high coupling between methods, which indicates potentially low reusability and increased testing because many methods can affect the same attributes. |
| Lack Of Cohesion Of Methods 2 | Counts the percentage of methods that do not access a specific attribute averaged over all attributes in the class. A high value of cohesion (a low lack of cohesion) implies that the class is well designed. |
| Lack Of Cohesion Of Methods 3 | Measures the dissimilarity of methods in a class by attributes. A low value indicates good class subdivision, implying simplicity and high reusability. A high lack of cohesion increases complexity, thereby increasing the likelihood of errors during the development process. |

TABLE 3

Complexity Metrics

| Complexity Metrics | Description |
| --- | --- |
| Attribute Complexity | Defined as the sum of each attribute's value in the class. |
| Cyclomatic | Represents the cognitive complexity of the class. It counts |

TABLE 3-continued

Complexity Metrics

| Complexity Metrics | Description |
| --- | --- |
| Complexity | the number of possible paths through an algorithm by counting the number of distinct regions on a flowgraph, i.e., the number of 'if,' 'for' and 'while' statements in the operation's body. |
| Number Of Remote Methods | Processes all of the methods and constructors, and counts the number of different remote methods called. A remote method is defined as a method which is not declared in either the class itself or its ancestors. |
| Response For Class | Calculated as 'Number of Local Methods' + 'Number of Remote Methods.' A class which provides a larger response set is considered to be more complex, and requires more testing than one with a smaller overall design complexity. |
| Weighted Methods Per Class 1 | The sum of the complexity of all methods for a class, where each method is weighted by its cyclomatic complexity. The number of methods and the complexity of the methods involved is a predictor of how much time and effort is required to develop and maintain the class. |
| Weighted Methods Per Class 2 | Measures the complexity of a class, assuming that a class with more methods than another is more complex, and that a method with more parameters than another is also likely to be more complex. |

TABLE 4

Coupling Metrics

| Coupling Metrics | Description |
| --- | --- |
| Coupling Between Objects | Represents the number of other classes to which a class is coupled. Counts the number of reference types that are used in attribute declarations, formal parameters, return types, throws declarations and local variables, and types from which attribute and method selections are made. Excessive coupling between objects is detrimental to modular design and prevents reuse. The more independent a class is, the easier it is to reuse it in another application. In order to improve modularity and promote encapsulation, inter-object class couples should be kept to a minimum. The larger the number of couples, the higher the sensitivity to changes in other parts of the design, and therefore maintenance is more difficult. A measure of coupling is useful to determine how complex the testing of various parts of a design is likely to be. The higher the inter-object class coupling, the more rigorous the testing needs to be. |
| Data Abstraction Coupling | Counts the number of reference types used in the attribute declarations. |
| FanOut | Counts the number of reference types that are used in attribute declarations, formal parameters, return types, throws declarations and local variables. |

TABLE 5

Halstead Metrics

| Halstead Metrics | Description |
| --- | --- |
| Halstead Difficulty | This measure is one of the Halstead Software Science metrics. It is calculated as ('Number of Unique Operators'/ 'Number of Unique Operands') * ('Number of Operands'/ 'Number of Unique Operands'). |
| Halstead Effort | This measure is one of the Halstead Software Science metrics. It is calculated as 'Halstead Difficulty' * 'Halstead Program Volume.' |
| Halstead Program Length | This measure is one of the Halstead Software Science metrics. It is calculated as 'Number of Operators' + 'Number of Operands.' |

TABLE 5-continued

Halstead Metrics

| Halstead Metrics | Description |
| --- | --- |
| Halstead Program Vocabulary | This measure is one of the Halstead Software Science metrics. It is calculated as 'Number of Unique Operators' + 'Number of Unique Operands.' |
| Halstead Program Volume | This measure is one of the Halstead Software Science metrics. It is calculated as 'Halstead Program Length' * Log2('Halstead Program Vocabulary'). |
| Number Of Operands | This measure is used as an input to the Halstead Software Science metrics. It counts the number of operands used in a class. |
| Number Of Operators | This measure is used as an input to the Halstead Software Science metrics. It counts the number of operators used in a class. |
| Number Of Unique Operands | This measure is used as an input to the Halstead Software Science metrics. It counts the number of unique operands used in a class. |
| Number Of Unique Operators | This measure is used as an input to the Halstead Software Science metrics. It counts the number of unique operators used in a class. |

TABLE 6

Inheritance Metrics

| Inheritance Metrics | Description |
| --- | --- |
| Depth Of Inheritance Hierarchy | Counts how far down the inheritance hierarchy a class or interface is declared. High values imply that a class is quite specialized. |
| Number Of Child Classes | Counts the number of classes which inherit from a particular class, i.e., the number of classes in the inheritance tree down from a class. Non-zero value indicates that the particular class is being re-used. The abstraction of the class may be poor if there are too many child classes. It should also be stated that a high value of this measure points to the definite amount of testing required for each child class. |

TABLE 7

Maximum Metrics

| Maximum Metrics | Description |
| --- | --- |
| Maximum Number Of Levels | Counts the maximum depth of 'if,' 'for' and 'while' branches in the bodies of methods. Logical units with a large number of nested levels may need implementation simplification and process improvement because groups that contain more than seven pieces of information are increasingly harder for people to understand in problem solving. |
| Maximum Number Of Parameters | Displays the maximum number of parameters among all class operations. Methods with many parameters tend to be more specialized and, thus, are less likely to be reusable. |
| Maximum Size Of Operation | Counts the maximum size of the operations for a class. Method size is determined in terms of cyclomatic complexity, i.e., the number of 'if,' 'for' and 'while' statements in the operation's body. |

TABLE 8

Polymorphism Metrics

| Polymorphism Metrics | Description |
|---|---|
| Number Of Added Methods | Counts the number of operations added by a class. A large value of this measure indicates that the functionality of the given class becomes increasingly distinct from that of the parent classes. In this case, it should be considered whether this class genuinely should be inheriting from the parent, or if it could be broken down into several smaller classes. |
| Number Of Overridden Methods | Counts the number of inherited operations which a class overrides. Classes without parents are not processed. High values tend to indicate design problems, i.e., subclasses should generally add to and extend the functionality of the parent classes rather than overriding them. |

TABLE 9

Ratio Metrics

| Ratio Metrics | Description |
|---|---|
| Comment Ratio | Counts the ratio of comments to total lines of code including comments. |
| Percentage Of Package Members | Counts the percentage of package members in a class. |
| Percentage Of Private Members | Counts the percentage of private members in a class. |
| Percentage Of Protected Members | Counts the percentage of protected members in a class. |
| Percentage Of Public Members | Counts the proportion of vulnerable members in a class. A large proportion of such members means that the class has high potential to be affected by external classes and means that increased efforts will be needed to test such a class thoroughly. |
| True Comment Ratio | Counts the ratio of comments to total lines of code excluding comments. |

The QA module also provides audits, i.e., the module checks for conformance to predefined or user-defined styles. The types of audits provided by the module include coding style, critical errors, declaration style, documentation, naming style, performance, possible errors and superfluous content. Examples of these audits with their respective definitions are identified in Tables 10–17 below.

TABLE 10

Coding Style Audits

| Coding Style Audits | Description |
|---|---|
| Access Of Static Members Through Objects | Static members should be referenced through class names rather than through objects. |
| Assignment To Formal Parameters | Formal parameters should not be assigned. |
| Complex Assignment | Checks for the occurrence of multiple assignments and assignments to variables within the same expression. Complex assignments should be avoided since they decrease program readability. |
| Don't Use the Negation Operator Frequently | The negation operator slows down the readability of the program. Thus, it is recommended that it not be used frequently. |
| Operator '?:' May Not Be Used | The operator '?:' makes the code harder to read than the alternative form with an if-statement. |
| Provide Incremental In For-Statement or use while-statement | Checks if the third argument of the 'for'-statement is missing. |
| Replacement For Demand Imports | Demand import-declarations must be replaced by a list of single import-declarations that are actually imported into the compilation unit. In other words, import-statements may not end with an asterisk. |
| Use Abbreviated Assignment Operator | Use the abbreviated assignment operator in order to write programs more rapidly. Also some compilers run faster with the abbreviated assignment operator. |
| Use 'this' Explicitly To Access Class Members | Tries to make the developer use 'this' explicitly when trying to access class members. Using the same class member names with parameter names often makes what the developer is referring to unclear. |

TABLE 11

Critical Errors Audits

| Critical Errors Audits | Description |
|---|---|
| Avoid Hiding Inherited Attributes | Detects when attributes declared in child classes hide inherited attributes. |
| Avoid Hiding Inherited Static Methods | Detects when inherited static operations are hidden by child classes. |
| Command Query Separation | Prevents methods that return a value from a modifying state. The methods used to query the state of an object must be different from the methods used to perform commands (change the state of the object). |
| Hiding Of Names | Declarations of names should not hide other declarations of the same name. |
| Inaccessible Constructor Or Method Matches | Overload resolution only considers constructors and methods that are visible at the point of the call. If, however, all the constructors and methods were considered, there may be more matches. This rule is violated in this case. Imagine that ClassB is in a different package than ClassA. Then the allocation of ClassB violates this rule since the second constructor is not visible at the point of the allocation, but it still matches the allocation (based on signature). Also the call to open in ClassB violates this rule since the second and the third declarations of open are not visible at the point of the call, but it still matches the call (based on signature). |
| Multiple Visible Declarations With Same Name | Multiple declarations with the same name must not be simultaneously visible except for overloaded methods. |
| Overriding a Non-Abstract Method With an Abstract Method | Checks for abstract methods overriding non-abstract methods in a subclass. |
| Overriding a Private Method | A subclass should not contain a method with the same name and signature as in a superclass if these methods are declared to be private. |

TABLE 11-continued

Critical Errors Audits

| Critical Errors Audits | Description |
|---|---|
| Overloading Within a Subclass | A superclass method may not be overloaded within a subclass unless all overloading in the superclass are also overridden in the subclass. It is very unusual for a subclass to be overloading methods in its superclass without also overriding the methods it is overloading. More frequently this happens due to inconsistent changes between the superclass and subclass - i.e., the intention of the user is to override the method in the superclass, but due to the error, the subclass method ends up overloading the superclass method. |
| Use of Static Attribute for Initialization | Non-final static attributes should not be used in initializations of attributes. |

TABLE 12

Declaration Style Audits

| Declaration Style Audits | Description |
|---|---|
| Badly Located Array Declarators | Array declarators must be placed next to the type descriptor of their component type. |
| Constant Private Attributes Must Be Final | Private attributes that never get their values changed must be declared final. By explicitly declaring them in such a way, a reader of the source code get some information of how the attribute is supposed to be used. |
| Constant Variables Must Be Final | Local variables that never get their values changed must be declared final. By explicitly declaring them in such a way, a reader of the source code obtains information about how the variable is supposed to be used. |
| Declare Variables In One Statement Each | Several variables (attributes and local variables) should not be declared in the same statement. |
| Instantiated Classes Should Be Final | This rule recommends making all instantiated classes final. It checks classes which are present in the object model. Classes from search/classpath are ignored. |
| List All Public And Package Members First | Enforces a standard to improve readability. Methods/data in your class should be ordered properly. |
| Order Of Appearance Of Modifiers | Checks for correct ordering of modifiers. For classes, this includes visibility (public, protected or private), abstract, static, final. For attributes, this includes visibility (public, protected or private), static, final, transient, volatile. For operations, this includes visibility (public, protected or private), abstract, static, final, synchronized, native. |
| Put the Main Function Last | Tries to make the program comply with various coding standards regarding the form of the class definitions. |

TABLE 13

Documentation Audits

| Documentation Audits | Description |
|---|---|
| Bad Tag In JavaDoc Comments | This rule verifies code against accidental use of improper JavaDoc tags. |

TABLE 13-continued

Documentation Audits

| Documentation Audits | Description |
|---|---|
| Distinguish Between JavaDoc And Ordinary Comments | Checks whether the JavaDoc comments in your program ends with '**/' and ordinary C-style ones with '*/.' |

TABLE 14

Naming Style Audits

| Naming Style Audits | Description |
|---|---|
| Class Name Must Match Its File Name | Checks whether top level classes or interfaces have the same name as the file in which they reside. |
| Group Operations With Same Name Together | Enforces standard to improve readability. |
| Naming Conventions | Takes a regular expression and item name and reports all occurrences where the pattern does not match the declaration. |
| Names Of Exception Classes | Names of classes which inherit from Exception should end with Exception. |
| Use Conventional Variable Names | One-character local variable or parameter names should be avoided, except for temporary and looping variables, or where a variable holds an undistinguished value of a type. |

TABLE 15

Performance Audits

| Performance Audits | Description |
|---|---|
| Avoid Declaring Variables Inside Loops | This rule recommends declaring local variables outside the loops since declaring variables inside the loop is less efficient. |
| Append To String Within a Loop | Performance enhancements can be obtained by replacing String operations with StringBuffer operations if a String object is appended within a loop. |
| Complex Loop Expressions | Avoid using complex expressions as repeat conditions within loops. |

TABLE 16

Possible Error Audits

| Possible Error Audits | Description |
|---|---|
| Avoid Public And Package Attributes | Declare the attributes either private or protected, and provide operations to access or change them. |
| Avoid Statements With Empty Body | Avoid statements with empty body. |
| Assignment To For-Loop Variables | 'For'-loop variables should not be assigned. |

TABLE 16-continued

Possible Error Audits

| Possible Error Audits | Description |
| --- | --- |
| Don't Compare Floating Point Types | Avoid testing for equality of floating point numbers since floating-point numbers that should be equal are not always equal due to rounding problems. |
| Enclosing Body Within a Block | The statement of a loop must always be a block. The 'then' and 'else' parts of 'if'-statements must always be blocks. This makes it easier to add statements without accidentally introducing bugs in case the developer forgets to add braces. |
| Explicitly Initialize All Variables | Explicitly initialize all variables. The only reason not to initialize a variable is where it's declared is if the initial value depends on some computation occurring first. |
| Method finalize() Doesn't Call super.finalize() | Calling of super.finalize() from finalize() is good practice of programming, even if the base class doesn't define the finalize() method. This makes class implementations less dependent on each other. |
| Mixing Logical Operators Without Parentheses | An expression containing multiple logical operators should be parenthesized properly. |
| No Assignments In Conditional Expressions | Use of assignment within conditions makes the source code hard to understand. |
| Use 'equals' Instead Of '==' | The '==' operator used on strings checks if two string objects are two identical objects. In most situations, however, one likes to simply check if two strings have the same value. In these cases, the 'equals' method should be used. |
| Use 'L' Instead Of 'l' at the end of integer constant | It is better to use uppercase 'L' to distinguish the letter 'l' from the number '1.' |
| Use Of the 'synchronized' Modifier | The 'synchronized' modifier on methods can sometimes cause confusion during maintenance as well as during debugging. This rule therefore recommends against using this modifier, and instead recommends using 'synchronized' statements as replacements. |

TABLE 17

Superfluous Content Audits

| Superfluous Content Audits | Description |
| --- | --- |
| Duplicate Import Declarations | There should be at most one import declaration that imports a particular class/package. |
| Don't Import the Package the Source File Belongs To | No classes or interfaces need to be imported from the package to which the source code file belongs. Everything in that package is available without explicit import statements. |
| Explicit Import Of the java.lang Classes | Explicit import of classes from the package 'java.lang' should not be performed. |
| Equality Operations On Boolean Arguments | Avoid performing equality operations on Boolean operands. 'True' and 'false' literals should not be used in conditional clauses. |
| Imported Items Must Be Used | It is not legal to import a class or an interface and never use it. This rule checks classes and interfaces that are explicitly imported with their names - that is not with import of a complete package, using an asterisk. If unused class and interface imports are omitted, the amount of meaningless source code is reduced - thus the amount of code to be understood by a reader is minimized. |
| Unnecessary Casts | Checks for the use of type casts that are not necessary. |
| Unnecessary | Verifies that the runtime type of the left-hand side |

TABLE 17-continued

Superfluous Content Audits

| Superfluous Content Audits | Description |
| --- | --- |
| 'instanceof' Evaluations | expression is the same as the one specified on the right-hand side. |
| Unused Local Variables And Formal Parameters | Local variables and formal parameter declarations must be used. |
| Use Of Obsolete Interface Modifier | The modifier 'abstract' is considered obsolete and should not be used. |
| Use Of Unnecessary Interface Member Modifiers | All interface operations are implicitly public and abstract. All interface attributes are implicitly public, final and static. |
| Unused Private Class Member | An unused class member might indicate a logical flaw in the program. The class declaration has to be reconsidered in order to determine the need of the unused member(s). |

Figure 8A:
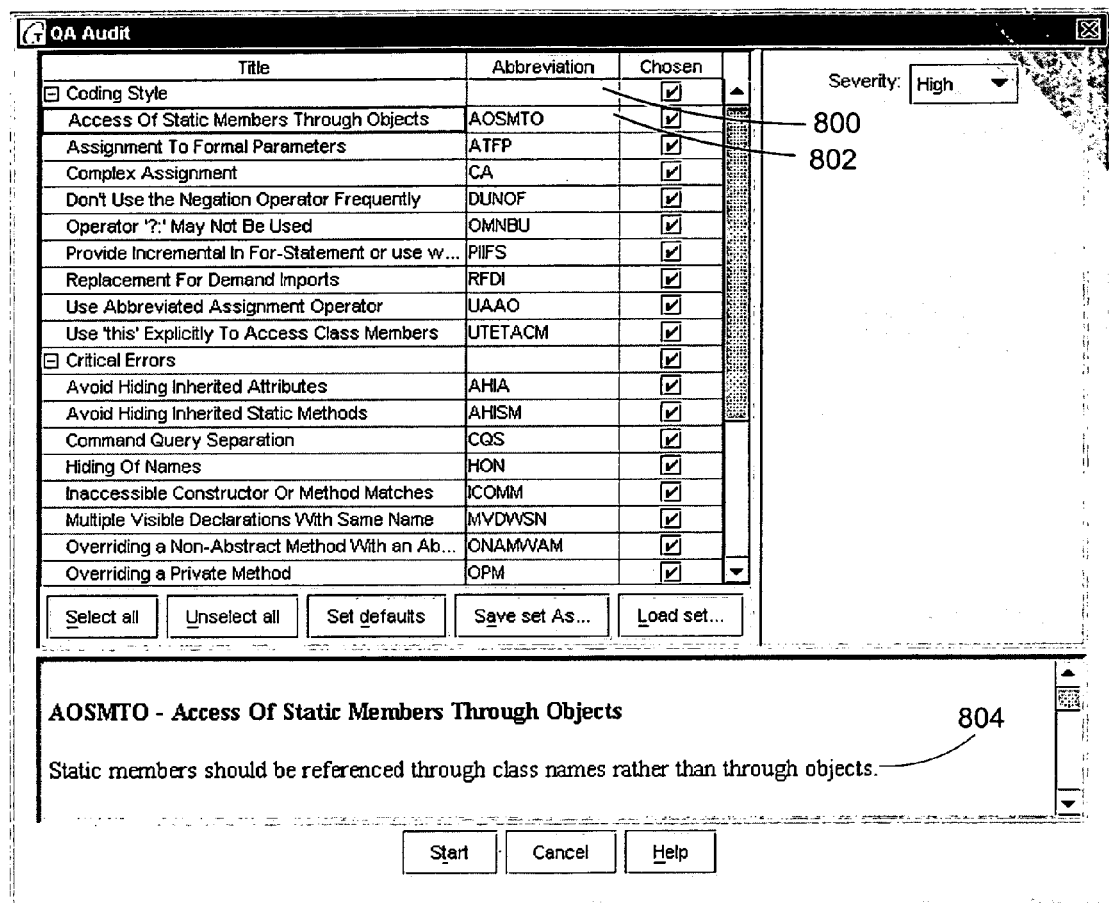
FIG. 8A depicts a user interface displayed by the software development tool depicted in FIG. 2, where the user interface displays a list of predefined criteria which the software development tool checks in the source code.
Figure 8B:
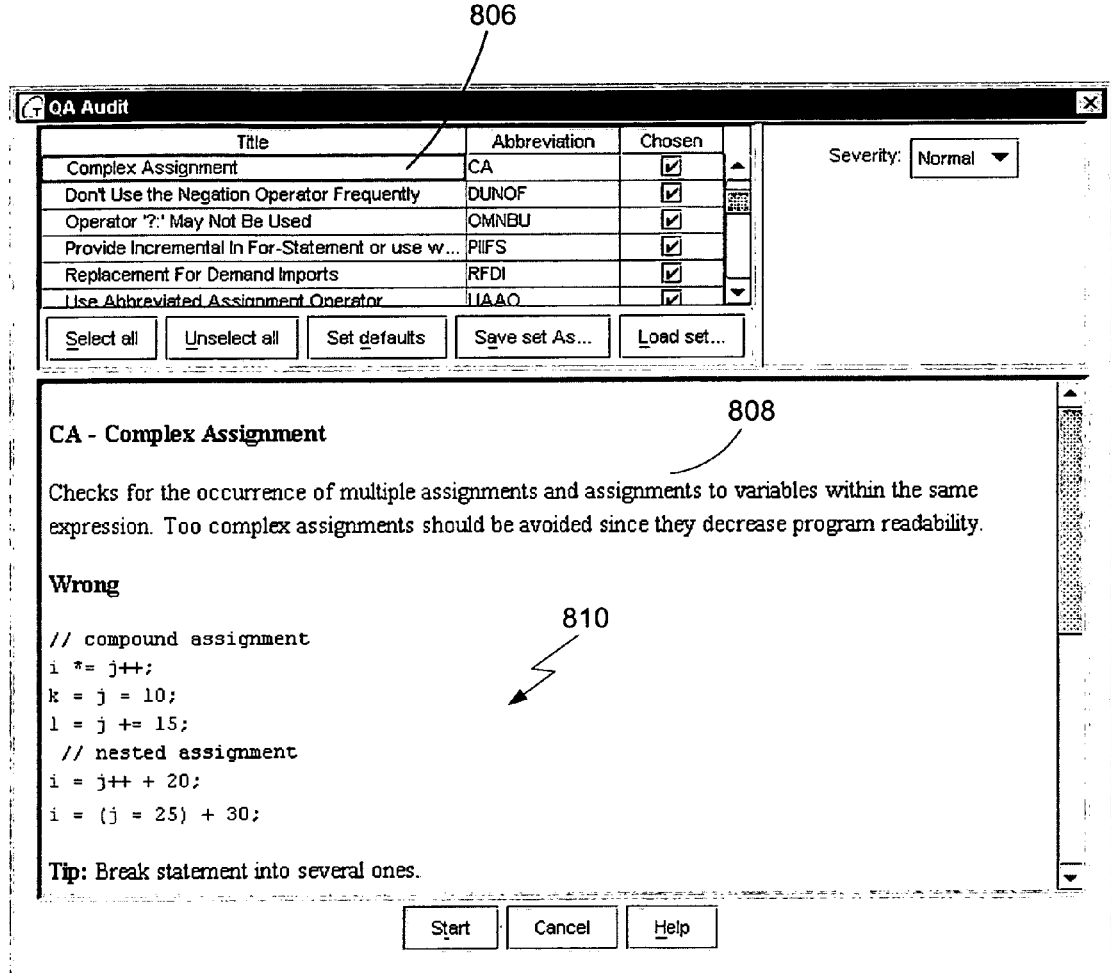
FIG. 8B depicts a user interface displayed by the software development tool depicted in FIG. 2, where the user interface displays the definition of the criteria which the software development tool checks in the source code, and an example of source code which does not conform to the criteria.
Figure 8C:
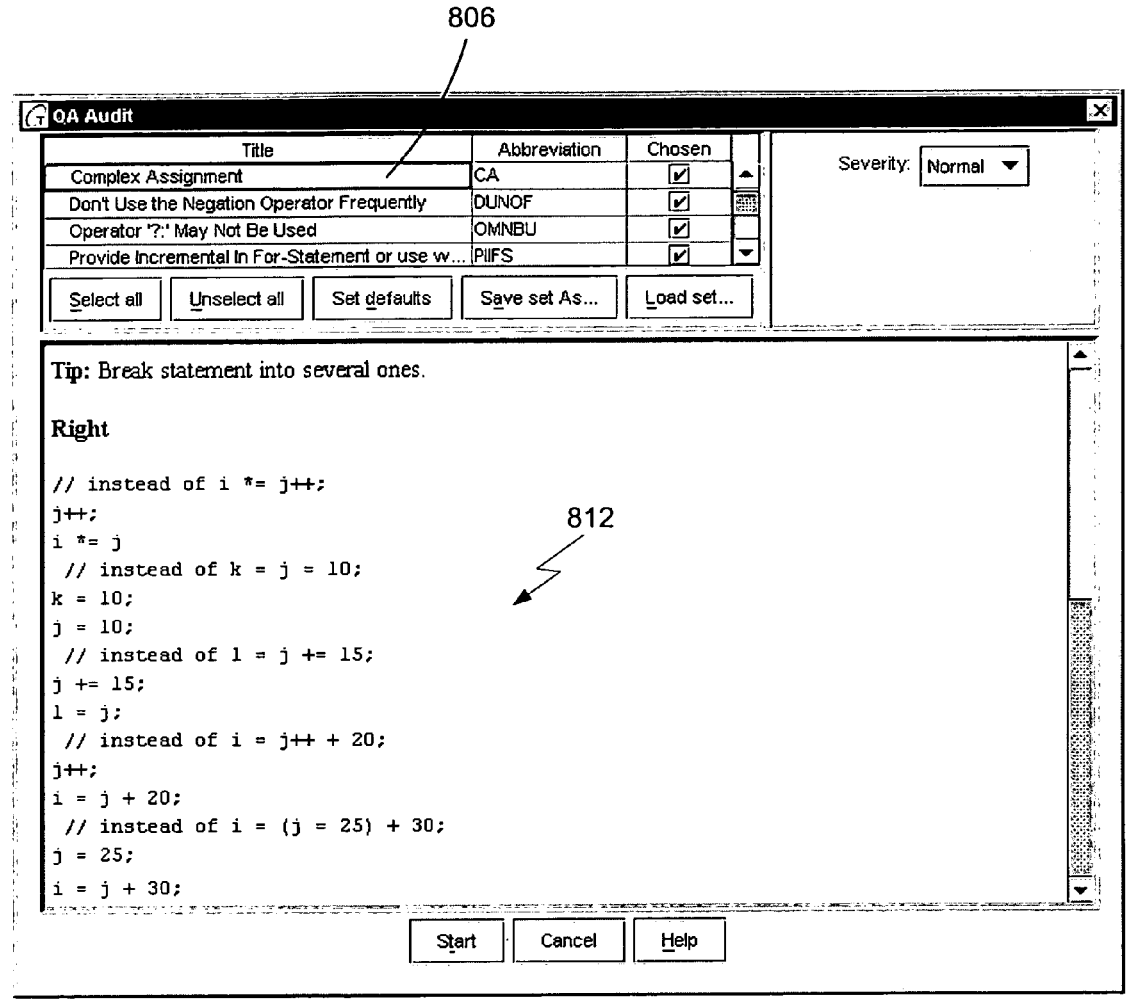
FIG. 8C depicts a user interface displayed by the software development tool depicted in FIG. 2, where the user interface displays an example of source code which conforms to the criteria which the software development tool checks in the source code.

If the QA module determines that the source code does not conform, an error message is provided to the developer. For example, as depicted in FIG. 8A, the software development tool checks for a variety of coding styles 800. If the software development tool were to check for "Access Of Static Members Through Objects" 802, it would verify whether static members are referenced through class names rather than through objects 804. Further, as depicted in FIG. 8B, if the software development tool were to check for "Complex Assignment" 806, the software development tool would check for the occurrence of multiple assignments and assignments to variables within the same expression to avoid complex assignments since these decrease program readability 808. An example of source code having a complex assignment 810 and source code having a non-complex assignment 812 are depicted in FIGS. 8B and 8C, respectively. The QA module of the software development tool monitors the source code for other syntax errors well known in the art, as described above, and provides an error message if any such errors are detected.

The improved software development tool of the present invention is used to develop source code in a project. The project comprises a plurality of files and the source code of one of the plurality of files is written in a given language. The software development tool determines the language of the source code of the file, converts the source code from the language into a language-neutral representation, uses the language-neutral representation to textually display the source code of the file in the language, and uses the language-neutral representation to display a graphical representation of at least a portion of the project. The source code and the graphical representation are displayed simultaneously.

The improved software development tool of the present invention is also used to develop source code. The software development tool receives an indication of a selected language for the source code, creates a file to store the source code in the selected language, converts the source code from the selected language into a language-neutral representation, uses the language-neutral representation to display the source code of the file, and uses the language-neutral representation to display a graphical representation of the file. Again, the source code and the graphical representation are displayed simultaneously.

Moreover, if the source code in the file is modified, the modified source code and a graphical representation of at least a portion of the modified source code are displayed simultaneously. The QA module of the software development tool provides an error message if the modification does not conform to predefined or user-defined styles, as described above. The modification to the source code may be received from the display of the source code, the display of the graphical representation of the project, or via some other independent software to modify the code. The graphical representation of the project may be in Unified Modeling Language; however, one skilled in the art will recognize that other graphical representations of the source code may be displayed. Further, although the present invention is described and shown using the various views of the UML, one of ordinary skill in the art will recognize that other views may be displayed.

Figure 9:
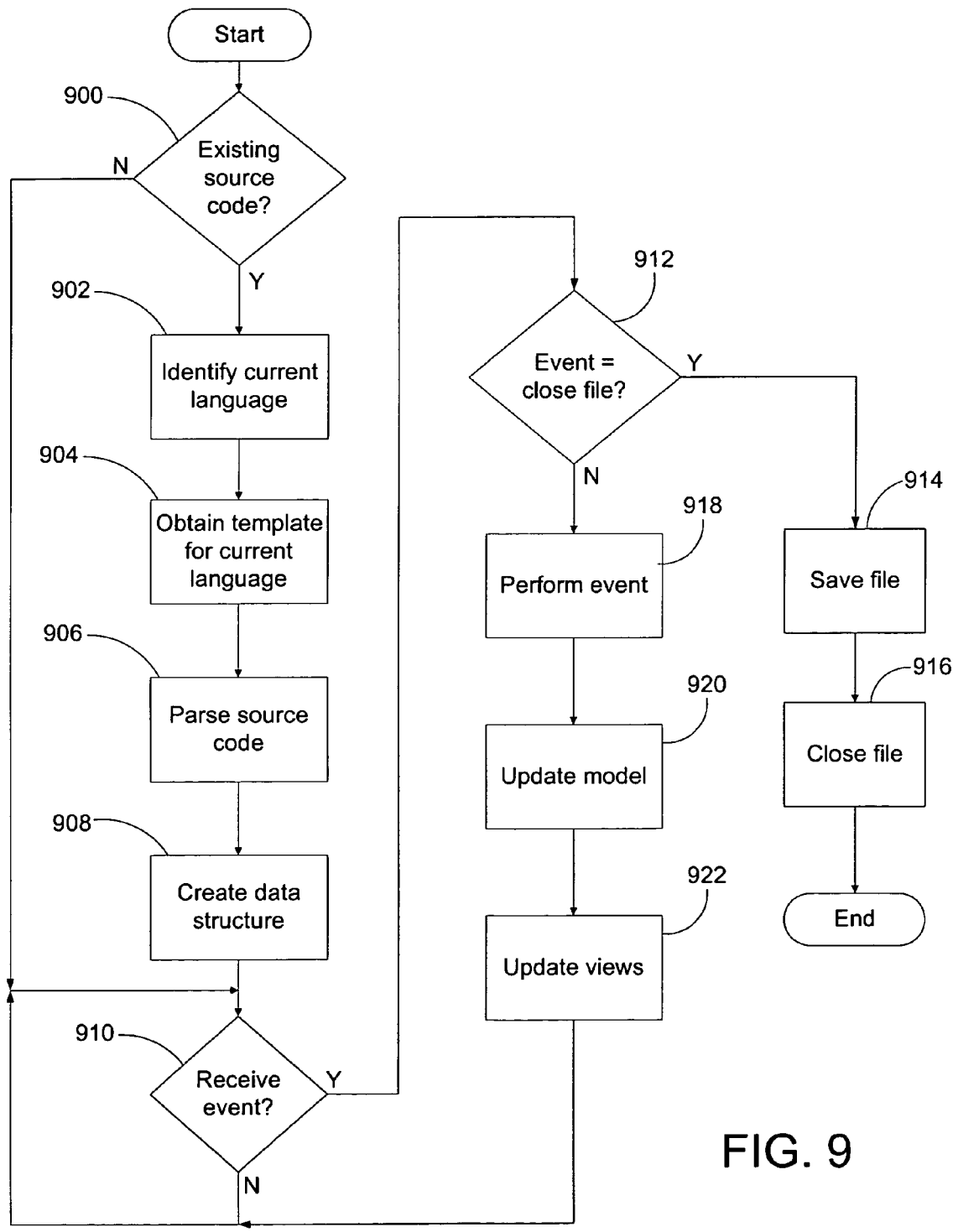
FIG. 9 depicts a flow diagram of the steps performed by the software development tool depicted in FIG. 2.

FIG. 9 depicts a flow diagram of the steps performed by the software development tool to develop a project in accordance with the present invention. As previously stated, the project comprises a plurality of files. The developer either uses the software development tool to open a file which contains existing source code, or to create a file in which the source code will be developed. If the software development tool is used to open the file, determined in step 900, the software development tool initially determines the programming language in which the code is written (step 902). The language is identified by the extension of the file, e.g., "java" identifies source code written in the Java™ language, while ".cpp" identifies source code written in C++. The software development tool then obtains a template for the current programming language, i.e., a collection of generalized definitions for the particular language that can be used to build the data structure (step 904). For example, the definition of a new Java™ class contains a default name, e.g., "Class1," and the default code, "public class Class1 { }." Such templates are well known in the art. For example, the "Microsoft Foundation Class Library" and the "Microsoft Word Template For Business Use Case Modeling" are examples of standard template libraries from which programmers can choose individual template classes. The software development tool uses the template to parse the source code (step 906), and create the data structure (step 908). After creating the data structure or if there is no existing code, the software development tool awaits an event, i.e., a modification or addition to the source code by the developer (step 910). If an event is received and the event is to close the file (step 912), the file is saved (step 914) and closed (step 916). Otherwise, the software development tool performs the event (step 918), i.e., the tool makes the modification. The software development tool then updates the TMM or model (step 920), as discussed in detail below, and updates both the graphical and the textual views (step 922).

Figure 10A:
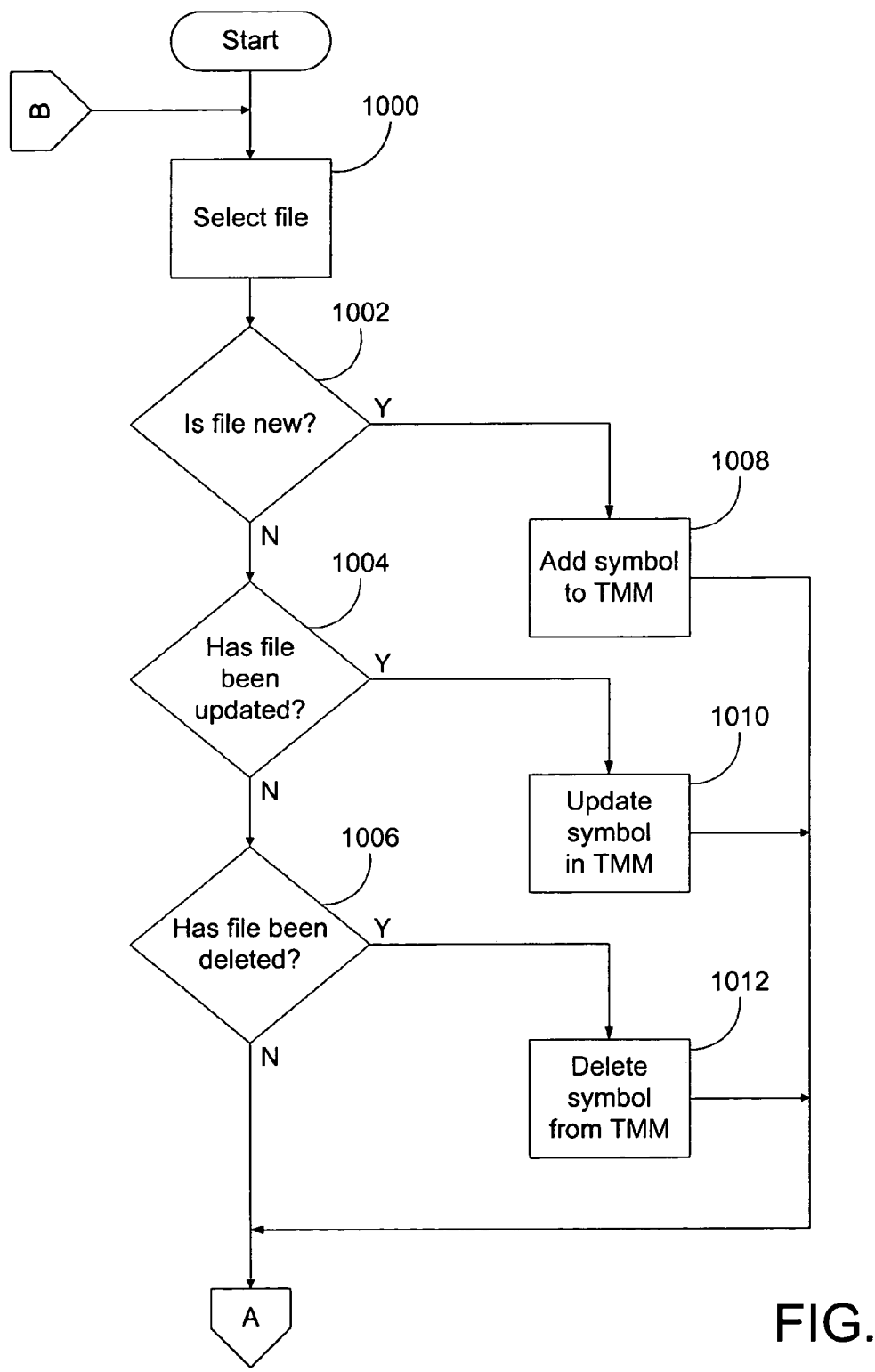
FIGS. 10A and 10B depict a flow diagram illustrating the update model step of FIG. 9.
Figure 10B:
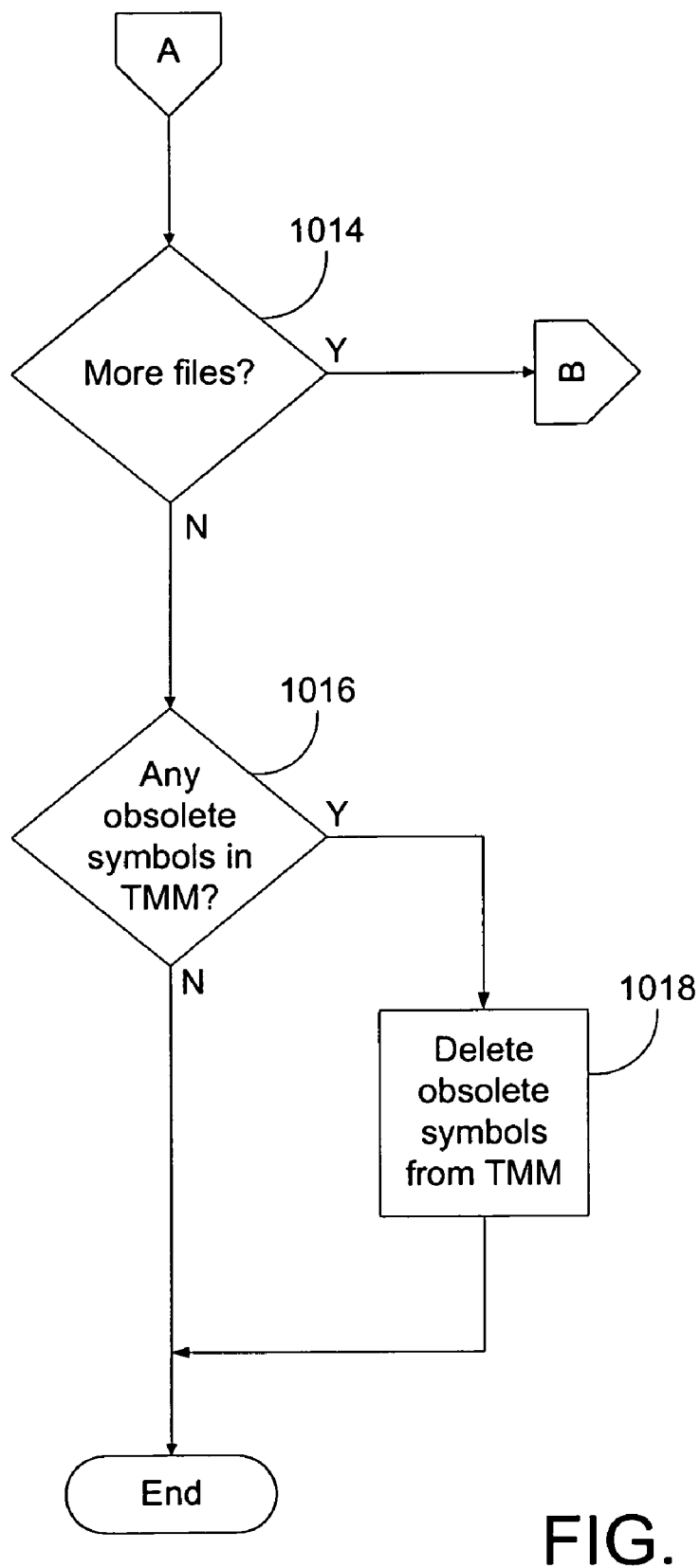

FIGS. 10A and 10B depict a flow diagram illustrating the update model step of FIG. 9. The software development tool selects a file from the project (step 1000), and determines whether the file is new (step 1002), whether the file has been updated (step 1004), or whether the file has been deleted (step 1006). If the file is new, the software development tool adds the additional symbols from the file to the TMM (step 1008). To add the symbol to the TMM, the software development tool uses the template to parse the symbol to the TMM. If the file has been updated, the software development tool updates the symbols in the TMM (step 1010). Similar to the addition of a symbol to the TMM, the software development tool uses the template to parse the symbol to the TMM. If the file has been deleted, the software development tool deletes the symbols in the TMM (step 1012). The software development tool continues this analysis for all files in the project. After all files are analyzed (step 1014), any obsolete symbols in the TMM (step 1016) are deleted (step 1018).

Figure 11:
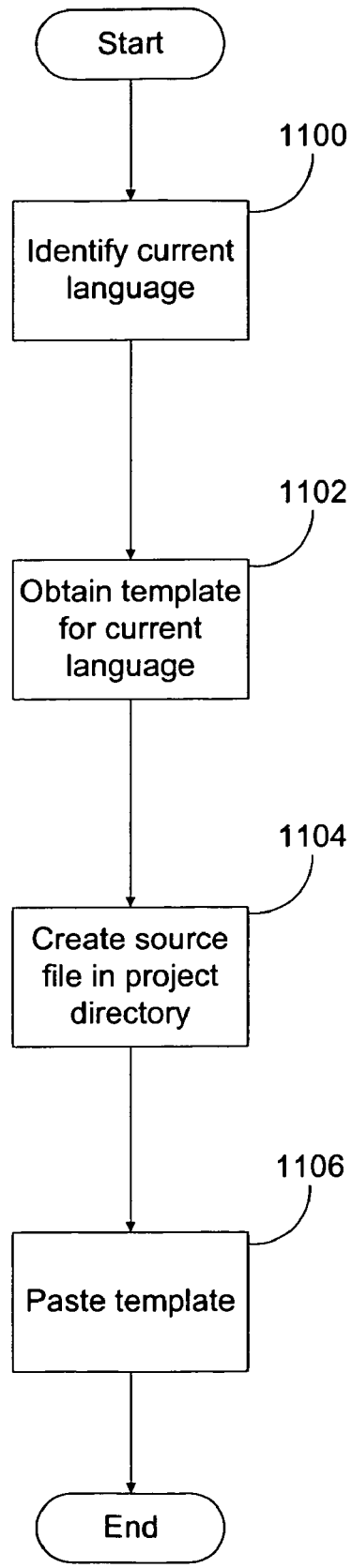
FIG. 11 depicts a flow diagram of the steps performed by the software development tool in FIG. 2 when creating a class.

FIG. 11 depicts a flow diagram illustrating the performance of an event, specifically the creation of a class, in accordance with the present invention. After identifying the programming language (step 1100), the software development tool obtains a template for the language (step 1102), creates a source code file in the project directory (step 1104), and pastes the template onto the TMM (step 1106). The project directory corresponds to the SCI model 302 of FIG. 3. Additional events which a developer may perform using the software development tool include the creation, modification or deletion of packages, projects, attributes, interfaces, links, operations, and the closing of a file.

Figure 12:
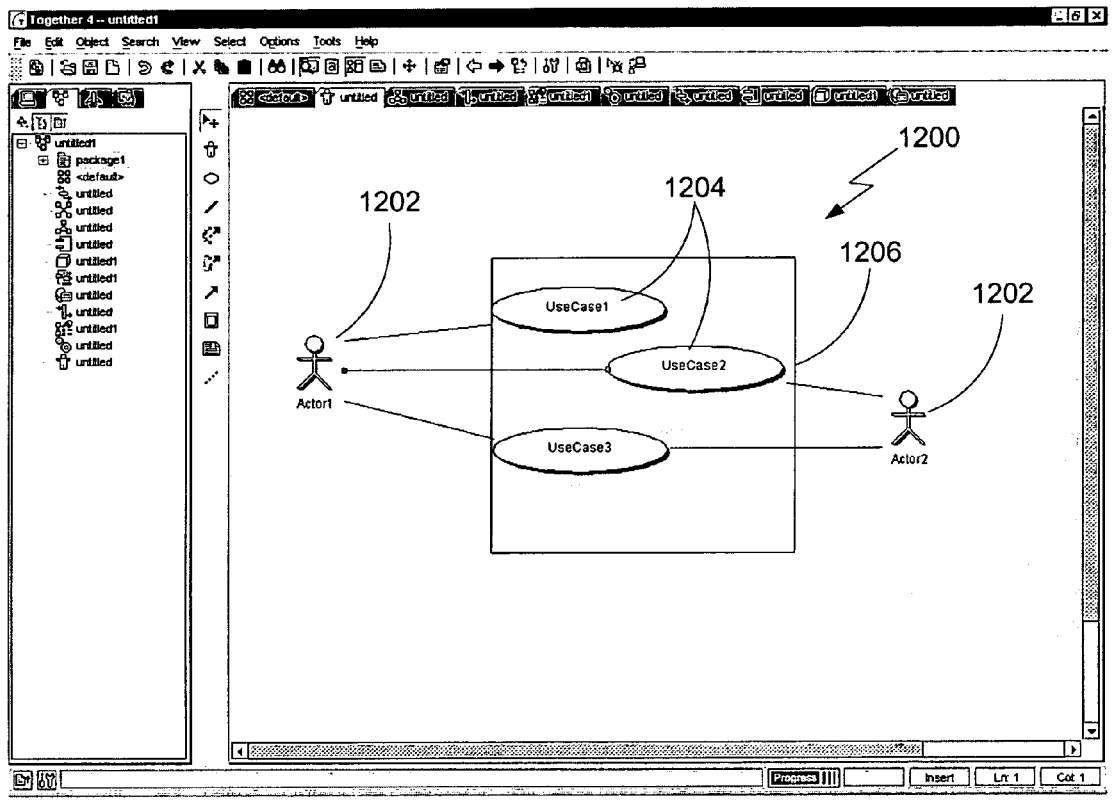
FIG. 12 depicts a user interface displayed by the software development tool depicted in FIG. 2, where the user interface displays a use case diagram of source code.
Figure 13:
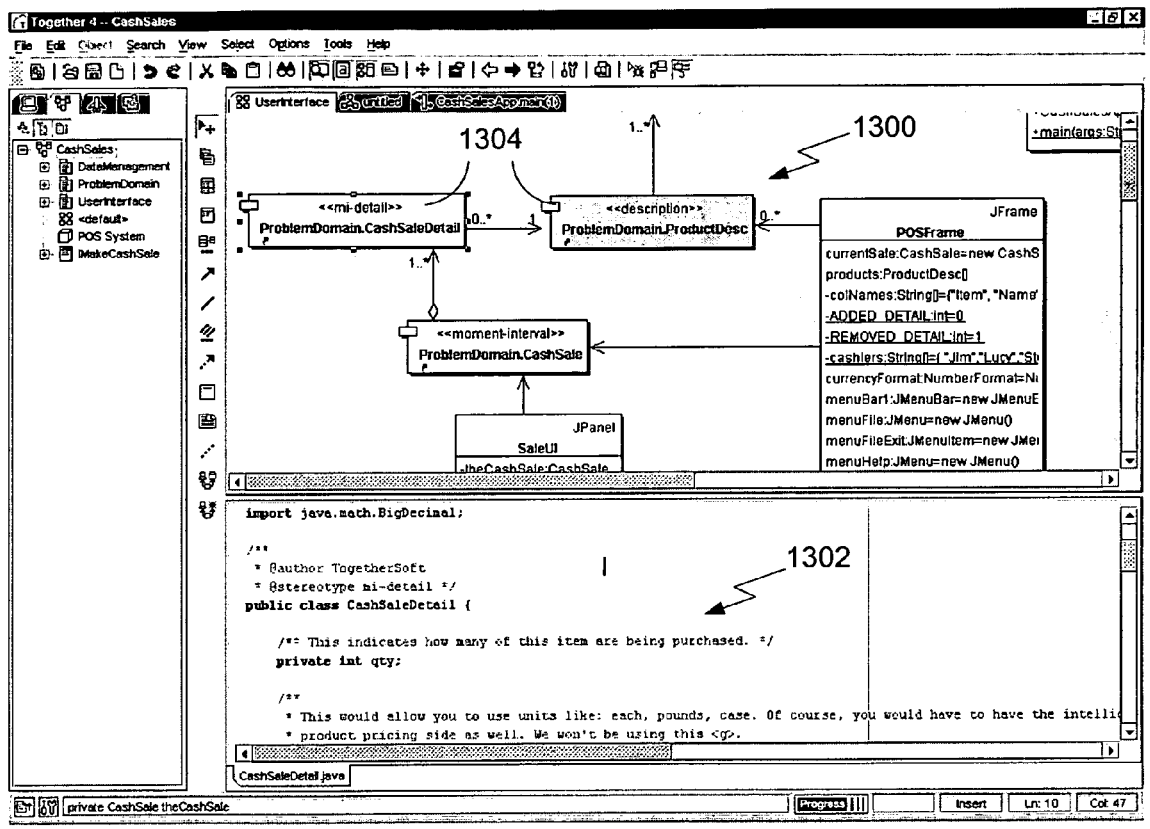
FIG. 13 depicts a user interface displayed by the software development tool depicted in FIG. 2, where the user interface displays both a class diagram and a textual view of source code.

The software development tool is collectively broken into three views of the application: the static view, the dynamic view, and the functional view. The static view is modeled using the use-case and class diagrams. A use case diagram 1200, depicted in FIG. 12, shows the relationship among actors 1202 and use cases 1204 within the system 1206. A class diagram 1300, depicted in FIG. 13 with its associated source code 1302, on the other hand, includes classes 1304, interfaces, packages and their relationships connected as a graph to each other and to their contents.

Figure 14:
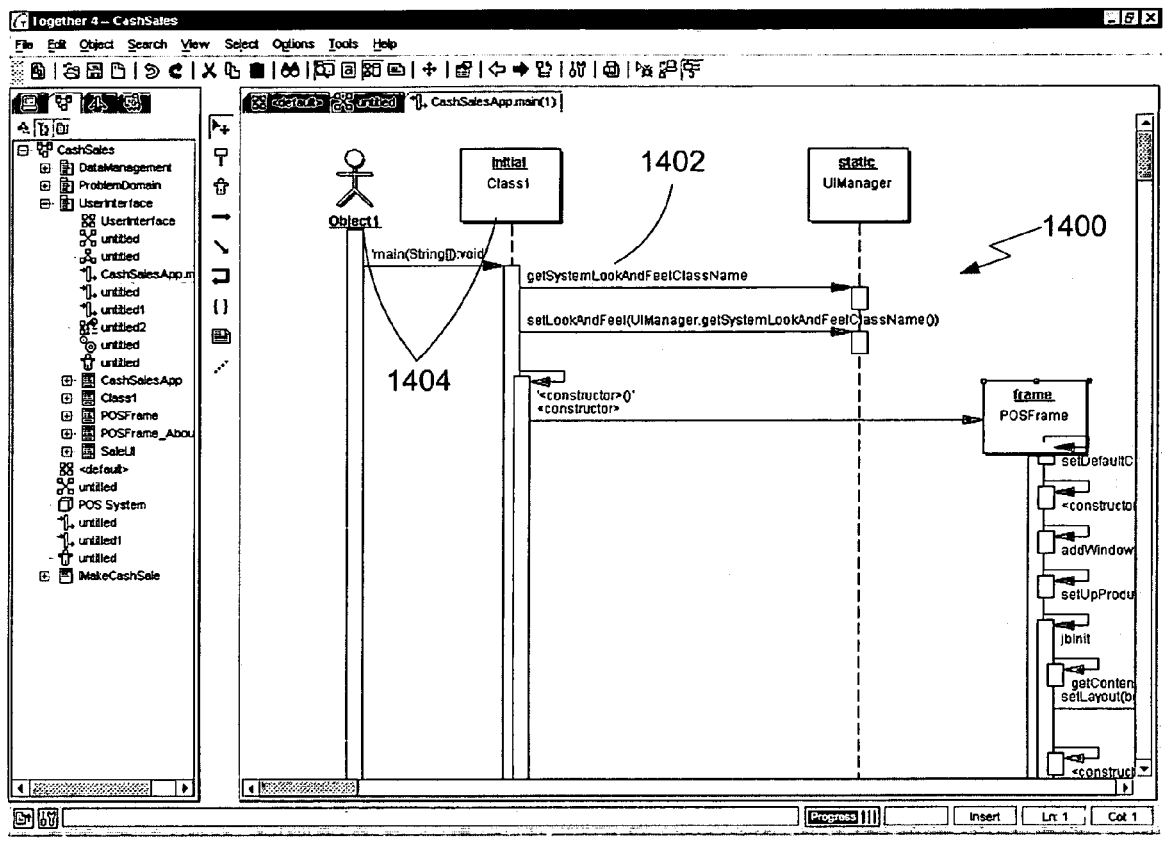
FIG. 14 depicts a user interface displayed by the software development tool depicted in FIG. 2, where the user interface displays a sequence diagram of source code.
Figure 15:
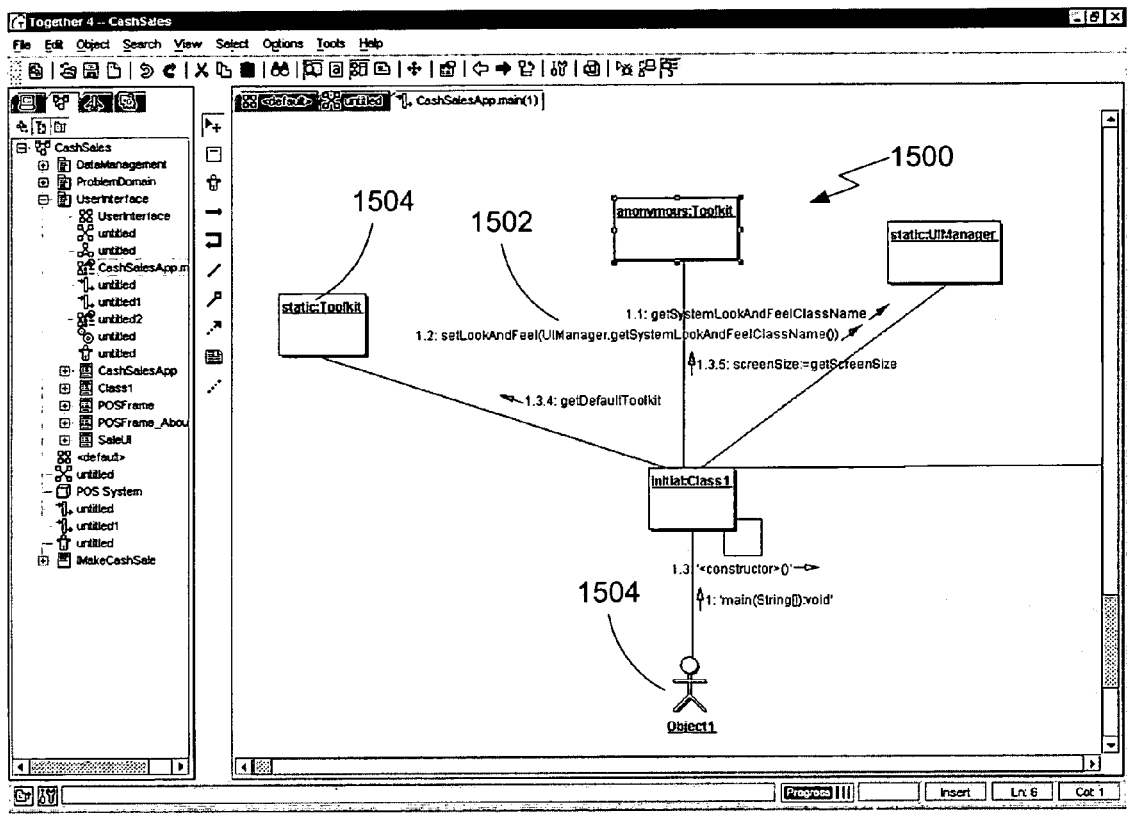
FIG. 15 depicts a user interface displayed by the software development tool depicted in FIG. 2, where the user interface displays a collaboration diagram of source code.

The dynamic view is modeled using the sequence, collaboration and statechart diagrams. As depicted in FIG. 14, a sequence diagram 1400 represents an interaction, which is a set of messages 1402 exchanged among objects 1404 within a collaboration to effect a desired operation or result. In a sequence diagram 1400, the vertical dimension represents time and the horizontal dimension represents different objects. A collaboration diagram 1500, depicted in FIG. 15, is also an interaction with messages 1502 exchanged among objects 1504, but it is also a collaboration, which is a set of objects 1504 related in a particular context. Contrary to sequence diagrams 1400 (FIG. 14), which emphasize the time ordering of messages along the vertical axis, collaboration diagrams 1500 (FIG. 15) emphasize the structural organization of objects.

Figure 16:
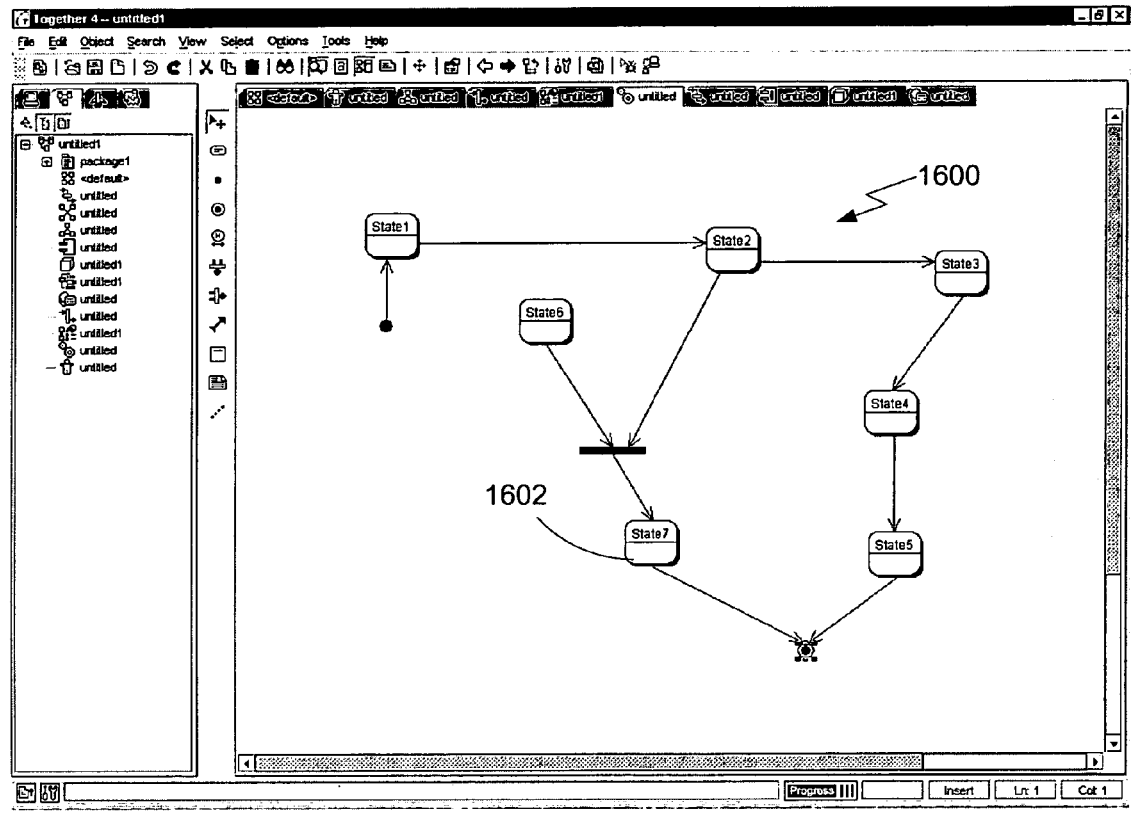
FIG. 16 depicts a user interface displayed by the software development tool depicted in FIG. 2, where the user interface displays a statechart diagram of source code.

A statechart diagram 1600 is depicted in FIG. 16. The statechart diagram 1600 includes the sequences of states 1602 that an object or interaction goes through during its life in response to stimuli, together with its responses and actions. It uses a graphic notation that shows states of an object, the events that cause a transition from one state to another, and the actions that result from the transition.

Figure 17:
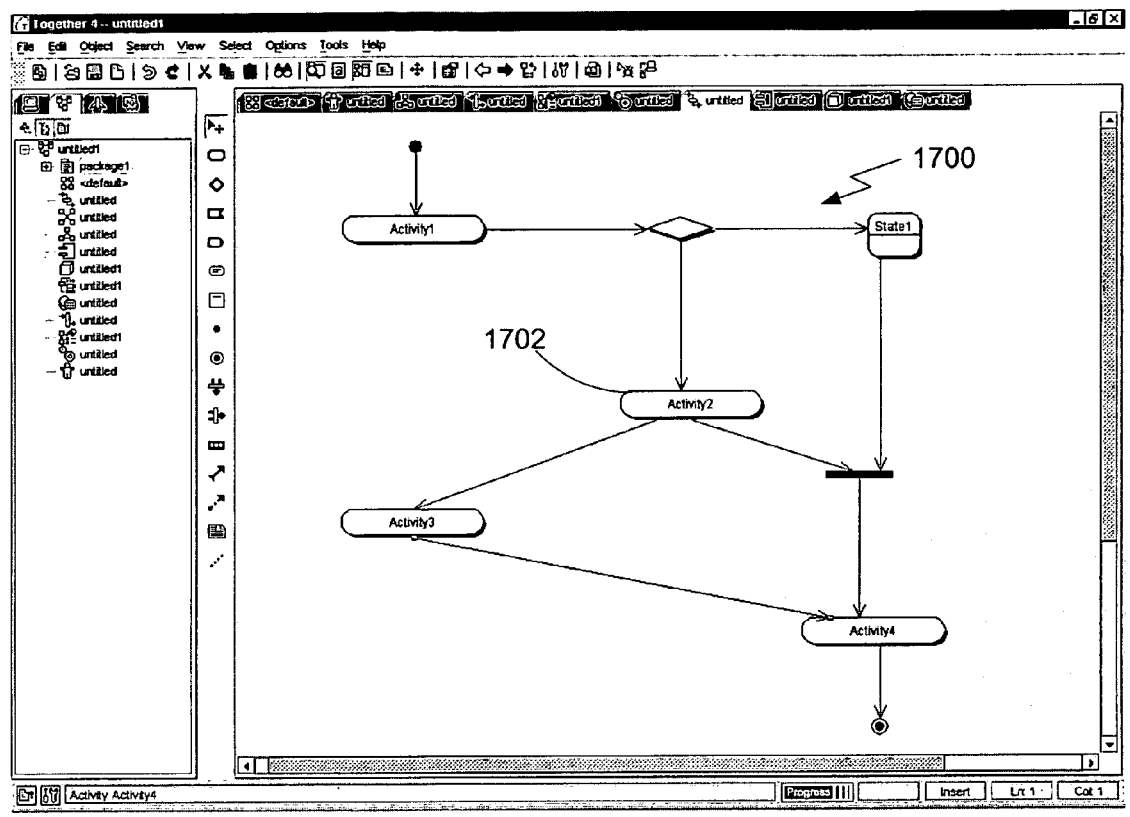
FIG. 17 depicts a user interface displayed by the software development tool depicted in FIG. 2, where the user interface displays an activity diagram of source code.

The functional view can be represented by activity diagrams 1700 and more traditional descriptive narratives such as pseudocode and minispecifications. An activity diagram 1700 is depicted in FIG. 17, and is a special case of a state diagram where most, if not all, of the states are action states 1702 and where most, if not all, of the transitions are triggered by completion of the actions in the source states. Activity diagrams 1700 are used in situations where all or most of the events represent the completion of internally generated actions.

Figure 18:
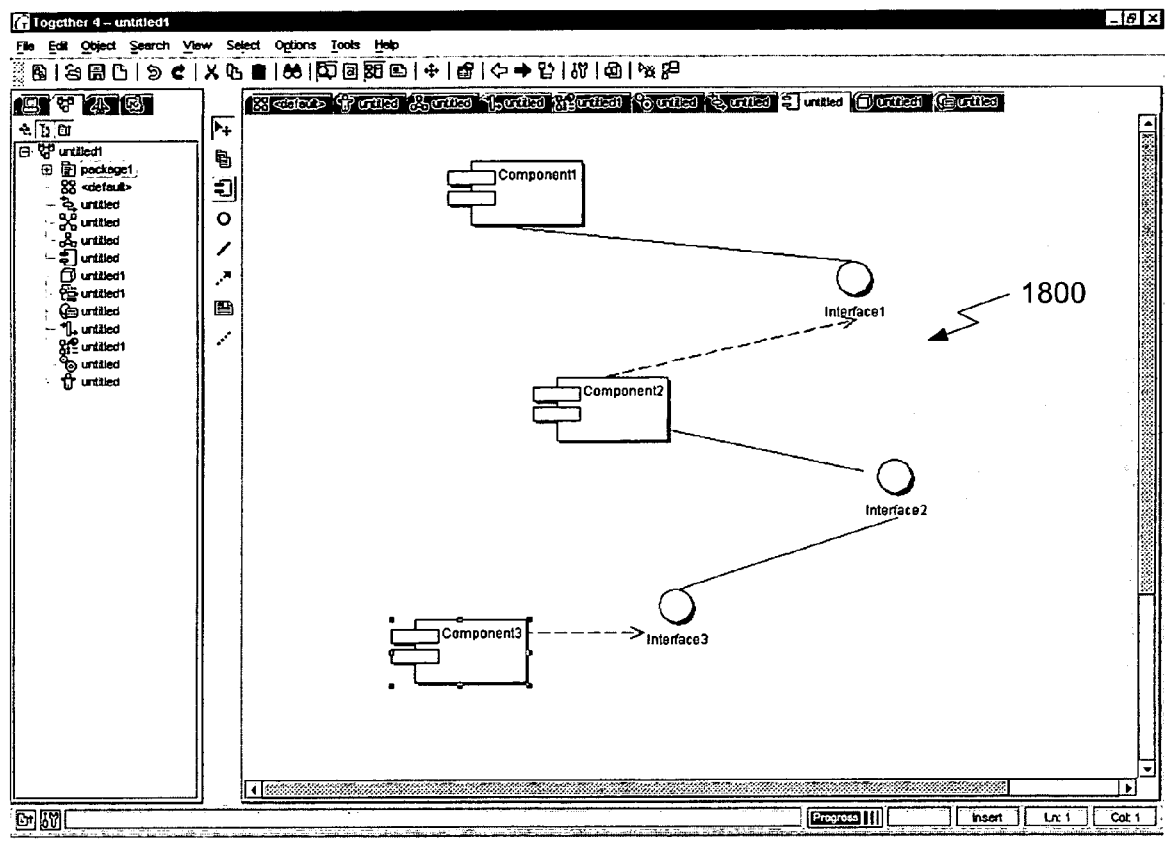
FIG. 18 depicts a user interface displayed by the software development tool depicted in FIG. 2, where the user interface displays a component diagram of source code.
Figure 19:
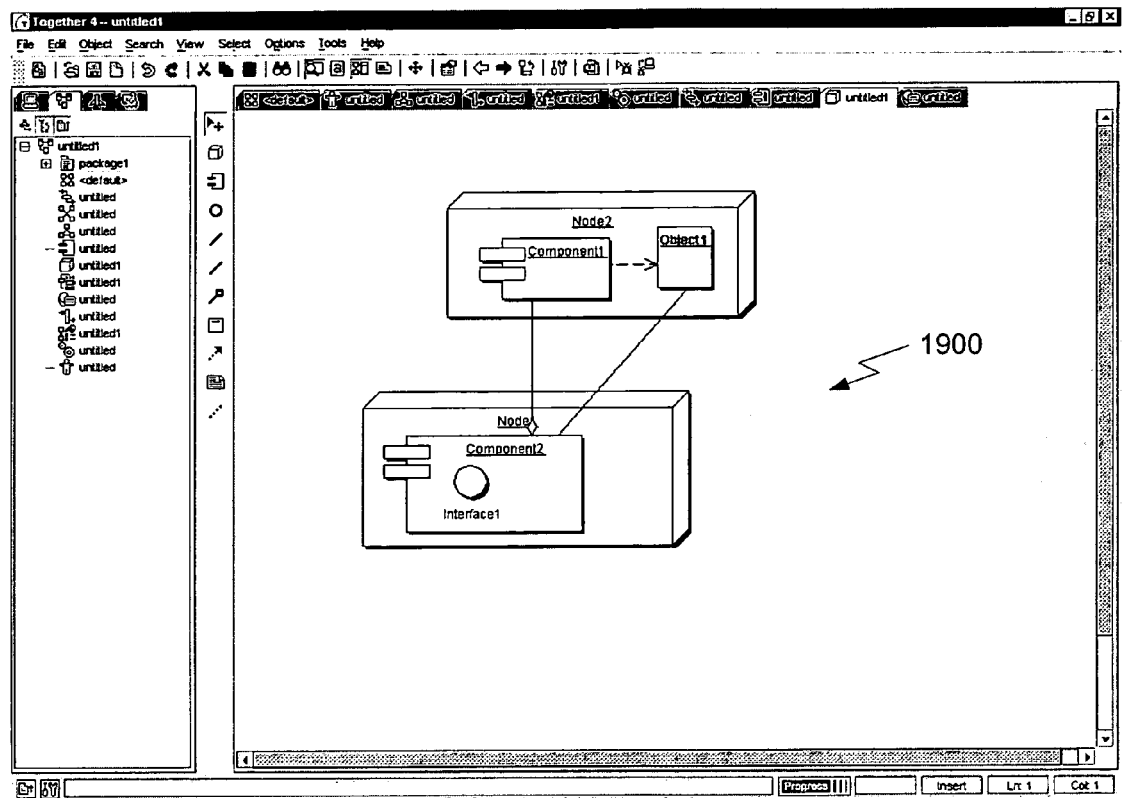
FIG. 19 depicts a user interface displayed by the software development tool depicted in FIG. 2, where the user interface displays a deployment diagram of source code.

There is also a fourth view mingled with the static view called the architectural view. This view is modeled using package, component and deployment diagrams. Package diagrams show packages of classes and the dependencies among them. Component diagrams 1800, depicted in FIG. 18, are graphical representations of a system or its component parts. Component diagrams 1800 show the dependencies among software components, including source code components, binary code components and executable components. As depicted in FIG. 19, Deployment diagrams 1900 are used to show the distribution strategy for a distributed object system. Deployment diagrams 1900 show the configuration of run-time processing elements and the software components, processes and objects that live on them.

Although discussed in terms of class diagrams, one skilled in the art will recognize that the software development tool of the present invention may support these and other graphical views.

The improved software development tool of the present invention is used to display versions of source code. Each version is an instance in an edit history. The software development tool determines a language of the source code, stores indications of the edits to the source code, converts the source code with the indications of the edits from the language into a language-neutral representation, uses the language-neutral representation to display the source code in the language with the indications of the edits, and uses the language-neutral representation to display the corresponding graphical representation of the source code with the indications of the edits. The rate at which the source code with the indications of the edits is displayed is adjustable. Moreover, the source code with the indications of the edits may be displayed sequentially or in reverse order.

Figure 20:
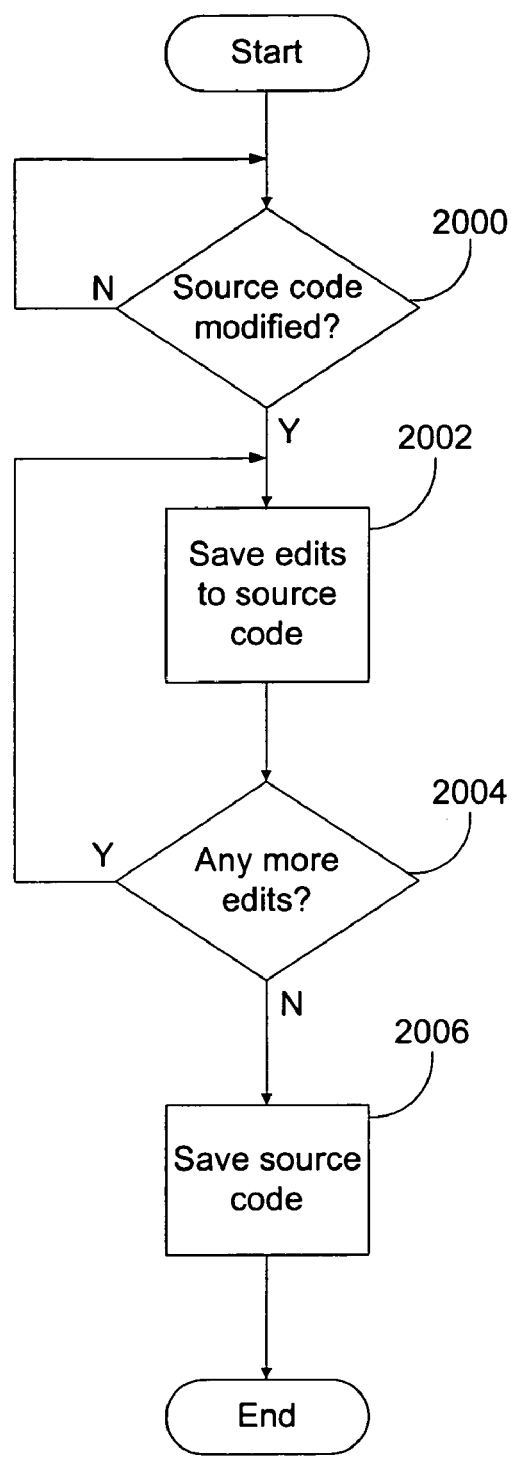
FIG. 20 depicts a flow diagram of the steps performed by the software development tool depicted in FIG. 2 to store the edit history of source code, in accordance with the present invention.

FIG. 20 depicts a flow diagram of the steps performed by the software development tool to store the edit history of source code. After the source code has been modified (step 2000), the software development tool saves the edits to the source code into the secondary storage (step 2002). After all edits have been made (step 2004), the software development tool saves the source code into the secondary storage (step 2006).

Figure 21A:
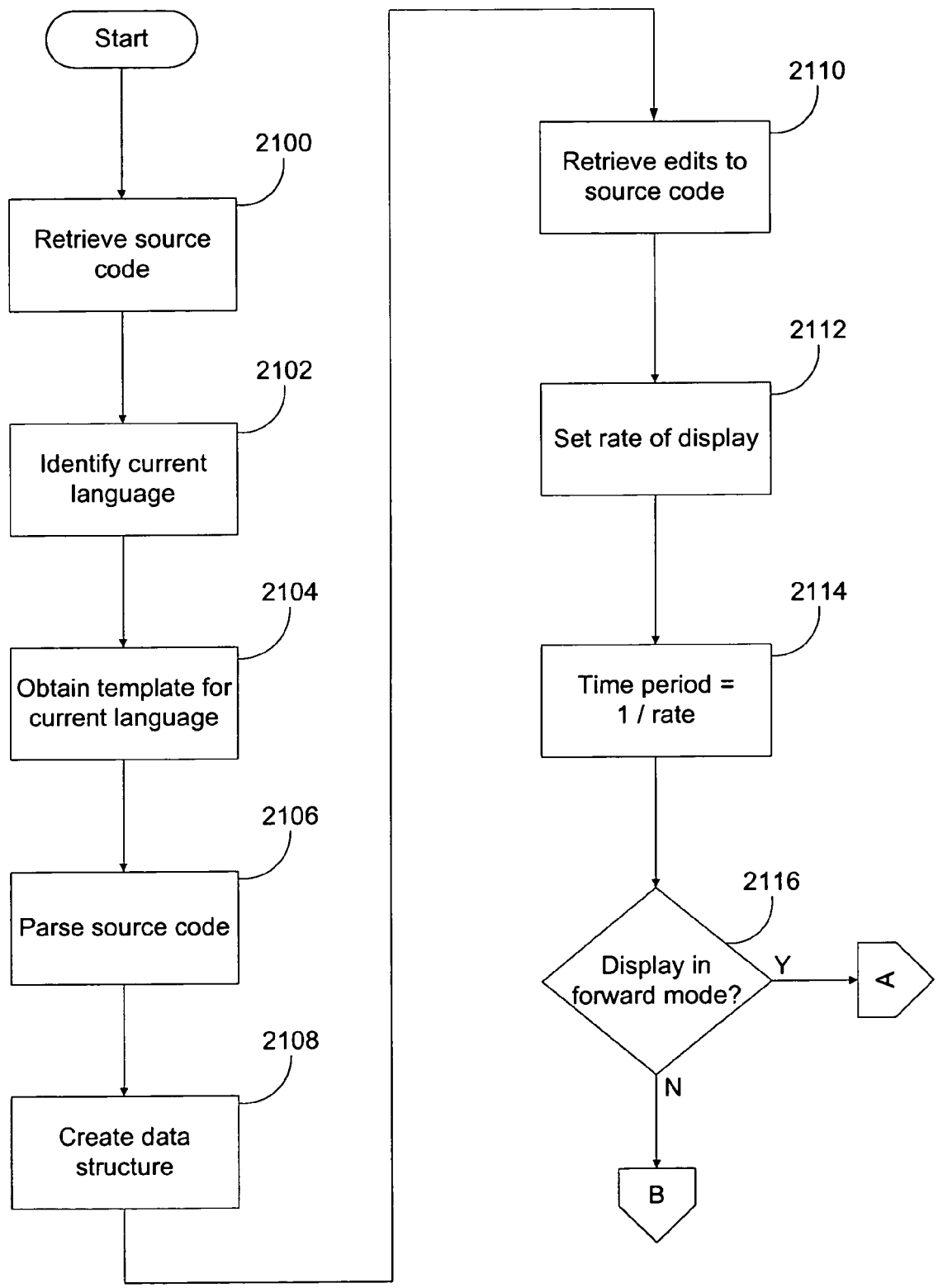
FIGS. 21A–C depict a flow diagram of the steps performed by the software development tool depicted in FIG. 2 to sequentially displaying the source code with the indications of the edit history, in accordance with the present invention.
Figure 21B:
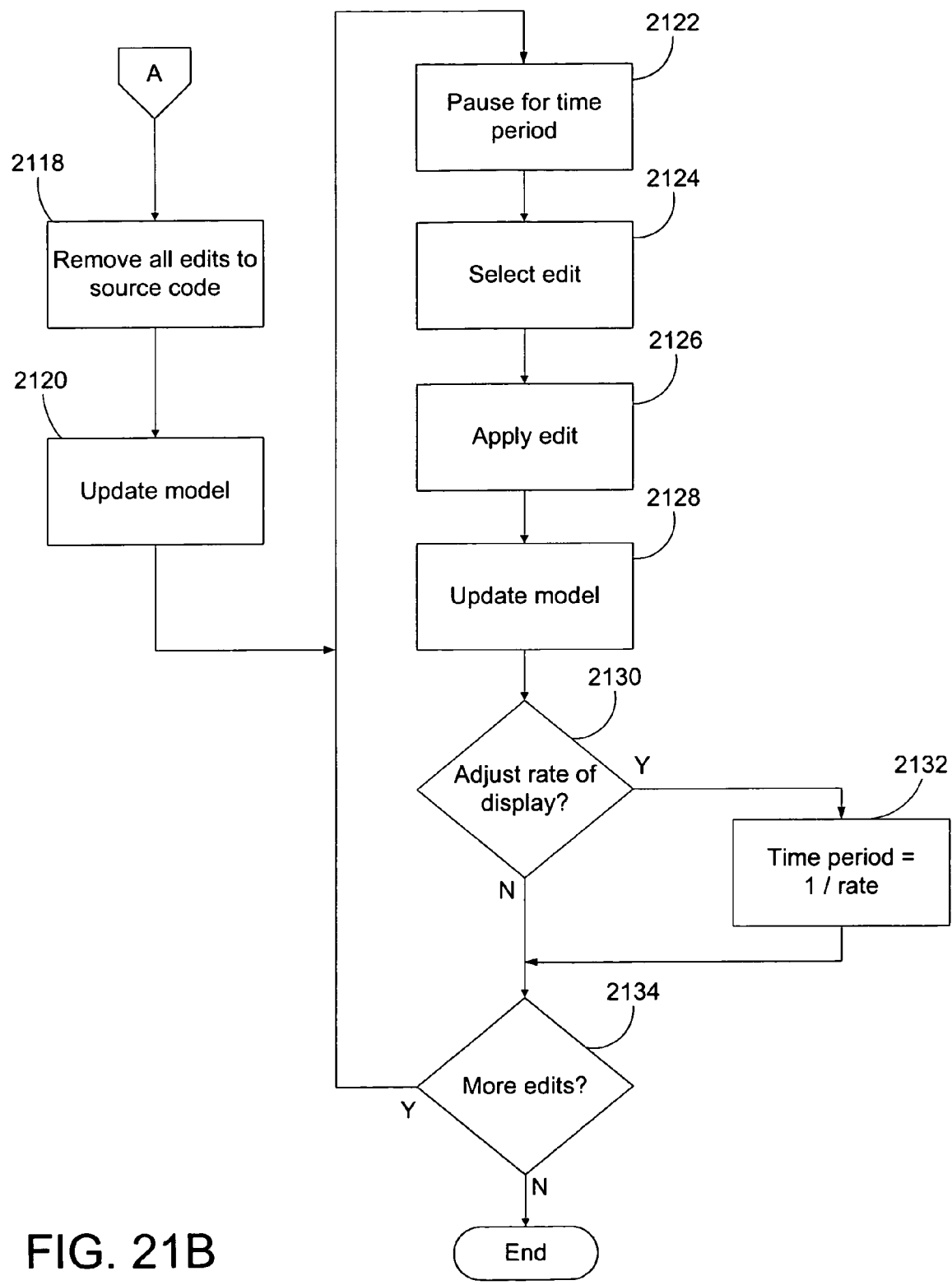
Figure 21C:
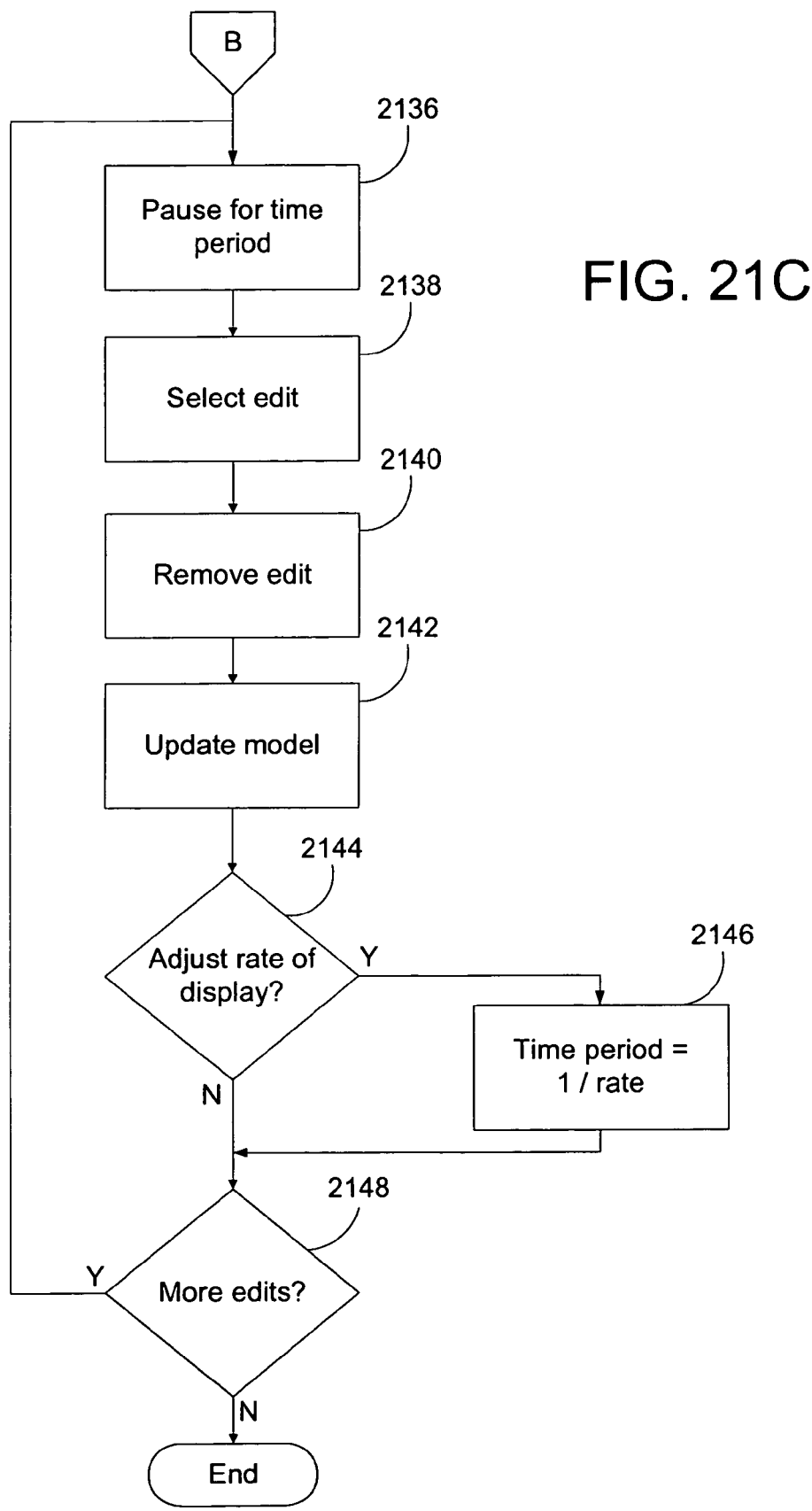

The steps performed by the software development tool to sequentially display the source code with the edit history is depicted in FIGS. 21A–C. The software development tool retrieves the source code (step 2100), identifies the programming language of the source code (step 2102), and obtains the template for the current programming language (step 2104). The software development tool then parses the source code (step 2106) and creates the data structure (step 2108). The software development tool retrieves the edit history, i.e., all of the edits which were stored for the source code (step 2110), and the user chooses a rate of displaying the source code (step 2112), thus setting the time period (step 2114). The user chooses whether to display the source code in the forward mode or in the reverse mode (step 2116).

In the forward mode shown in FIG. 21B, the software development tool removes all edits to the source code (step 2118) and updates the model (step 2120). The software development tool pauses for the time period determined by the rate at which the source code is displayed (step 2122), and for each edit (step 2124), the software development tool applies the edit to the source code (step 2126) before updating the model (step 2128). If the user chooses to adjust the rate of the display (step 2130), the time period is adjusted accordingly (step 2132). The process then continues with the next edit (step 2134).

In the reverse mode depicted in FIG. 21C, the software development tool pauses for the time period (step 2136), and for each edit (step 2138), the software development tool removes the edit from the source code (step 2140) before updating the model (step 2142). If the user chooses to adjust the rate of the display (step 2144), the software development tool adjusts the time period accordingly (step 2146). The process then continues with the next edit (step 2148).

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method in a data processing system for displaying versions of a source code, each version reflecting an instance in an edit history, the method comprising the steps of:
   determining the language of the source code;
   storing indications of the edits to the source code;
   converting the source code with the indications of the edits from the language into a language-neutral representation that includes a data structure having a source code interface (SCI) model, an SCI package, an SCI class, and an SCI member; and
   using language-neutral representation to simultaneously display a text representation and a corresponding graphical representation of the converted source code with the indications of the edits, showing visual differences of the source code through time,
      wherein the graphical representation of the converted source code displays a diagrammatic representation of the source code to demonstrate relationships between elements of the source code, and
      wherein the graphical representation of the source code is not an alpha-numeric display and is not merely a text representation on a user interface, and calculating metrics selected from a group consisting of basic metrics, cohesion metrics, complexity metrics, coupling metrics, Halstead metrics, inheritance metrics, maximum metrics, polymorphism metrics, and maximum metrics by way of a quality assurance module, which monitors the modifications to the source code.

2. The method of claim 1, wherein the source code and the corresponding graphical representation of the converted source code are displayed sequentially.

3. The method of claim 1, wherein a rate at which the source code with the indications of the edits is displayed is adjustable.

4. The method of claim 1, wherein the source code with the indications of the edits is displayed in reverse order.

5. The method of claim 1, wherein the graphical representation is one from a group consisting of a use case diagram, a sequence diagram, a collaboration diagram, a state transition diagram, an activity diagram, a package diagram, a component diagram and a deployment diagram.

6. A method in a data processing system for displaying versions of a source code, the method comprising the steps of:
   storing an edit to the source code; and
   displaying simultaneously a text representation and a corresponding language-neutral graphical representation of the source code that includes a data structure having a source code interface (SCI) model, an SCI package, an SCI class, and an SCI member with an indication of the edit,
      wherein the language-neutral graphical representation of the source code displays a diagrammatic representation of the source code demonstrating relationships between elements of the source code, and
      wherein the language-neutral graphical representation of the source code is not an alpha-numeric numeric display and is not merely a text representation on a user interface, and calculating metrics selected from a group consisting of basic metrics, cohesion metrics, complexity metrics, coupling metrics, Halstead metrics, inheritance metrics, maximum metrics, polymorphism metrics, and maximum metrics by way of a quality assurance module, which monitors the modifications to the source code.

7. The method of claim 5, wherein the step of displaying the source code comprises the steps of:
determining a language of the source code;
converting the source code from the language into the language-neutral graphical representation that includes a data structure having a source code interface (SCI) model, an SCI package, an SCI class, and an SCI member; and
using the language-neutral graphical representation to simultaneously display a text representation and a graphical representation of the converted source code with an indication of the source code edit.

8. The method of claim 7, wherein the source code is displayed after the converted source code with an indication of the edit is displayed.

9. A computer-readable medium containing instructions for controlling a data processing system to perform a method, the data processing system having versions of a source code, each version reflecting an instance in an edit history, the method comprising the steps of:
determining a language of the source code;
storing indications of the edits to the source code;
converting the source code with the indications of the edits from the language into a language-neutral representation that includes a data structure having a source code interface (SCI) model, an SCI package, an SCI class, and an SCI member; and
using the language-neutral representation to simultaneously display a text representation and a corresponding graphical representation of the source code with indications of all the edits;
wherein the graphical representation of the source code displays a diagrammatic representation of the source code demonstrating relationships between elements of the source code, and
wherein the graphical representation of the source code is not an alpha-numeric display and is not merely a text representation on a user interface, and
calculating metrics selected from a group consisting of basic metrics, cohesion metrics, complexity metrics, coupling metrics, Halstead metrics, inheritance metrics, maximum metrics, polymorphism metrics, and maximum metrics by way of a quality assurance module, which monitors the modifications to the source code.

10. The computer-readable medium of claim 9, wherein the source code and the corresponding graphical representation of the source code are displayed sequentially.

11. The computer-readable medium of claim 9, wherein a rate at which the source code with the indications of the edits is displayed is adjustable.

12. The computer-readable medium of claim 9, wherein the source code with the indications of the edits is displayed in reverse order.

13. The computer-readable medium of claim 9, wherein the graphical representation is one from a group consisting of a class diagram, a use case diagram, a sequence diagram, a collaboration diagram, a state transition diagram, an activity diagram, a package diagram, a component diagram and a deployment diagram.

14. A computer-readable medium containing instructions for controlling a data processing system to perform a method, the data processing system having versions of a source code, each version reflecting an instance in an edit history, the method comprising the steps of:
storing indications of the edits to the source code; and
displaying simultaneously a text representation and a language-neutral graphical representation of
the source code that includes a data structure having a source code interface (SCI) model, an SCI package, an SCI class, and an SCI member with indications of all the edits, wherein the language-neutral graphical representation of the source code of the source code displays
a diagrammatic representation of the source code to demonstrate relationships between elements of the source code, and
wherein the language-neutral graphical representation of the source code is not an
alpha-numeric display and is not merely a text representation on a user interface, and
calculating metrics selected from a group consisting of basic metrics, cohesion metrics, complexity metrics, coupling metrics, Halstead metrics, inheritance metrics, maximum metrics, polymorphism metrics, and maximum metrics by way of a quality assurance module, which monitors the modifications to the source code.

15. The computer-readable medium of claim 14, wherein the versions of the source code are displayed sequentially.

16. The computer-readable medium of claim 14, wherein a rate at which the source code with the indications of the edits is displayed is adjustable.

17. The computer-readable medium of claim 14, wherein the source code with the indications of the edits is displayed in reverse order.

18. The computer-readable medium of claim 14, wherein the language-neutral graphical representation is one from a group consisting of a class diagram, a use diagram, a sequence diagram, a collaboration diagram, a state transition diagram, an activity diagram, a package diagram, a component diagram and a deployment diagram.

19. A computer-readable medium containing instructions for controlling a data processing system to perform a method, the data processing system having a source code, the method comprising the steps of:
storing an edit to the source code;
displaying simultaneously a text representation and a language-neutral graphical representation of the source code that includes a data structure having a source code interface (SCI) model, an SCI package, an SCI class, and an SCI member with indications of all the edits,
wherein the language-neutral graphical representation of the source code displays a diagrammatic representation of the source code to demonstrate relationships between elements of the source code, and
wherein the language-neutral graphical representation of the source code is not an alpha-numeric display and is not merely a text representation on a user interface, and
calculating metrics selected from a group consisting of cohesion metrics, complexity metrics, coupling metrics, Halstead metrics, inheritance metrics, maximum metrics, polymorphism metrics, and maximum metrics by way of a quality assurance module, which monitors the modifications to the source code.

20. The computer-readable medium of claim 19, wherein the step of displaying the source code comprises the steps of:
- determining a language of the source code;
- converting the source code from the language into the language-neutral representation; and
- using the language-neutral representation to simultaneously display a text representation and a corresponding graphical representation of the converted source code with an indication of the edit.

21. The computer-readable medium of claim 19, wherein the step of displaying the source code with the edit comprises the steps of:
- converting the source code with an indication of the edit from the language into the language-neutral graphical representation; and
- using the language-neutral representation of the converted source code with an indication of the edit to display the graphical representation of the source code with the edit.

22. The computer-readable medium of claim 19, wherein the source code is displayed after the source code with the edit is displayed.

23. A data processing system comprising:
- a secondary storage including a source code;
- a memory device including:
  - a program that stores indications of edits to the source code into the memory device, and that simultaneously displays a text representation and a corresponding language-neutral graphical representation of the source code that includes a data structure having a source code interface (SCI) model, an SCI package, an SCI class, and an SCI member with indications of all edits,
  - wherein the language-neutral graphical representation of the source code displays a diagrammatic representation of the source code to demonstrate relationships between elements of the source code, and
  - wherein the language-neutral graphical representation of the source code is not an alpha-numeric display and is not merely a text representation on a user interface of the source code with the indications of the edits;
- a quality assurance module which monitors the modifications to the source code and calculates metrics selected from a group consisting of basic metrics, cohesion metrics, complexity metrics, coupling metrics, Halstead metrics, inheritance metrics, maximum metrics polymorphism metrics, and maximum metrics; and
- a processor for running the program.

24. The data processing system of claim 23, wherein the source code with the indications of the edits are displayed sequentially.

25. The data processing system of claim 23, wherein a rate at which the source codes with the indications of the edits is displayed is adjustable.

26. The data processing system of claim 23, wherein the source code with the indications of the edits is displayed in reverse order.

27. The data processing system of claim 23, wherein the program further
- determines the language of the source code,
- converts the source code with the indications of the edits from the language into the language-neutral graphical representation, and
- uses the language-neutral graphical representation to simultaneously display a text representation and a corresponding graphical representation of the source code with indications of all the edits.

28. The data processing system of claim 27, wherein the memory device further comprises a transient meta model, wherein said transient meta model stores the language neutral graphical representation of the source code.

29. The data processing system of claim 23, wherein the graphical representation is one from a group consisting of a class diagram, a use case diagram, a sequence diagram, a collaboration diagram, a state transition diagram, an activity diagram, a package diagram, a component diagram and a deployment diagram.

30. A system for displaying versions of a source code, each version reflecting an instance in an edit history, the system comprising:
- means for storing indications of the edits to the source code; and
- means for simultaneously displaying a text representation and a language-neutral graphical representation of the source code that includes a data structure having a source code interface (SCI) model, an SCI package, an SCI class, and an SCI member with the indications of all the edits,
- wherein the graphical representation of the source code displays
  - a diagrammatic representation of the source code to demonstrate
  - relationships between elements of the source code, and
- wherein the graphical representation of the source code is not an alpha-numeric display and is not merely a text representation on a user interface, and
- a means for calculating metrics selected from a group consisting of basic metrics, cohesion metrics, complexity metrics, coupling metrics, Halstead metrics, inheritance metrics, maximum metrics, polymorphism metrics, and maximum metrics.

* * * * *

UNITED STATES PATENT AND TRADEMARK OFFICE
CERTIFICATE OF CORRECTION

PATENT NO.       : 6,993,710 B1
APPLICATION NO. : 09/680065
DATED            : January 31, 2006
INVENTOR(S)      : Coad et al.

Page 1 of 1

It is certified that error appears in the above-identified patent and that said Letters Patent is hereby corrected as shown below:

In Column 20, Line 13, please delete the second occurrence of the words "of the source code"

Signed and Sealed this

Fifth Day of September, 2006

JON W. DUDAS
*Director of the United States Patent and Trademark Office*